US010909304B2

(12) United States Patent
Fitzpatrick

(10) Patent No.: US 10,909,304 B2
(45) Date of Patent: Feb. 2, 2021

(54) METHODS AND SYSTEMS FOR WYSIWYG WEB CONTENT GENERATION

(71) Applicant: PAGECLOUD INC., Ottawa (CA)

(72) Inventor: Craig Fitzpatrick, Ottawa (CA)

(73) Assignee: Pagecloud Inc., Ottawa (CA)

( * ) Notice: Subject to any disclaimer, the term of this patent is extended or adjusted under 35 U.S.C. 154(b) by 329 days.

(21) Appl. No.: 15/749,153

(22) PCT Filed: Jul. 28, 2016

(86) PCT No.: PCT/CA2016/000200
§ 371 (c)(1),
(2) Date: Jan. 31, 2018

(87) PCT Pub. No.: WO2017/020110
PCT Pub. Date: Feb. 9, 2017

(65) Prior Publication Data
US 2018/0225265 A1 Aug. 9, 2018

Related U.S. Application Data

(60) Provisional application No. 62/199,306, filed on Jul. 31, 2015.

(51) Int. Cl.
G06F 40/109 (2020.01)
G06F 16/951 (2019.01)
G06F 3/0486 (2013.01)
G06F 16/958 (2019.01)
G06F 40/14 (2020.01)
G06F 40/166 (2020.01)

(52) U.S. Cl.
CPC .......... *G06F 40/109* (2020.01); *G06F 3/0486* (2013.01); *G06F 16/951* (2019.01); *G06F 16/958* (2019.01); *G06F 40/14* (2020.01); *G06F 40/166* (2020.01)

(58) Field of Classification Search
None
See application file for complete search history.

(56) References Cited

U.S. PATENT DOCUMENTS 9,430,583 B1* 8/2016 Flake .................. G06F 16/9577
2011/0283243 A1* 11/2011 Eckhardt ............. G06F 3/04886
715/865

(Continued)

*Primary Examiner* — Frank D Mills
(74) *Attorney, Agent, or Firm* — Rosenberg, Klein & Lee

(57) ABSTRACT

Whilst the Internet has become a dominant communications medium through a variety of services the main portal to the vast majority of this content is through a webpage associated with a user, a group, enterprise, retailer etc. For those generating the content they are today essentially stuck with two options, one expensive option for full creative control and flexibility via web developers and website development enterprises, the other cheaper option to use an enterprise offering templates and work within their constraints. In contrast, embodiments of the invention provide conventional features the user is familiar with such as cut, copy, paste etc. allowing them to edit, manipulate, and create directly within a webpage using a tool that works directly within their website such that changes are automatically live on the Internet when completed but has the familiarity of a standard graphics editing or word processing tool.

16 Claims, 30 Drawing Sheets

(56) References Cited

U.S. PATENT DOCUMENTS

| | | | |
|---|---|---|---|
| 2012/0151329 A1* | 6/2012 | Cordasco | G06F 11/3006 715/234 |
| 2013/0326348 A1* | 12/2013 | Ip | G06F 40/129 715/269 |
| 2014/0372865 A1* | 12/2014 | Corob | G06F 40/166 715/234 |
| 2015/0193386 A1* | 7/2015 | Wurtz | G06F 40/109 715/269 |
| 2015/0234793 A1* | 8/2015 | Patel | G06F 8/60 715/269 |

* cited by examiner

Figure 3C
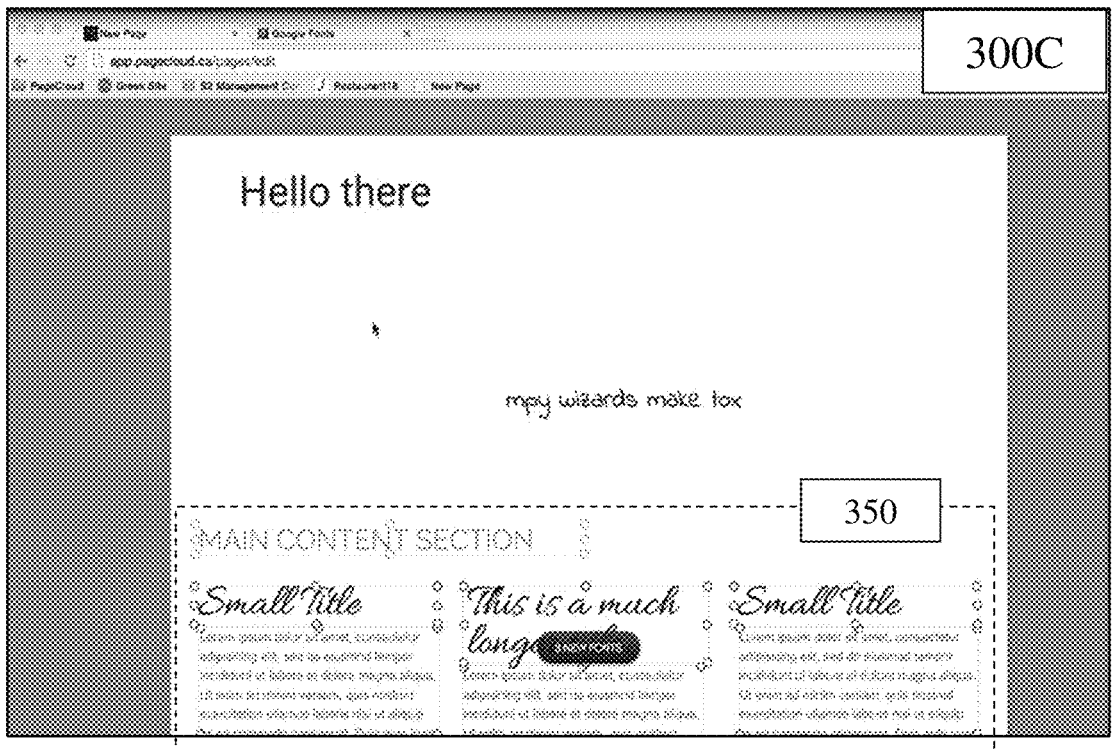
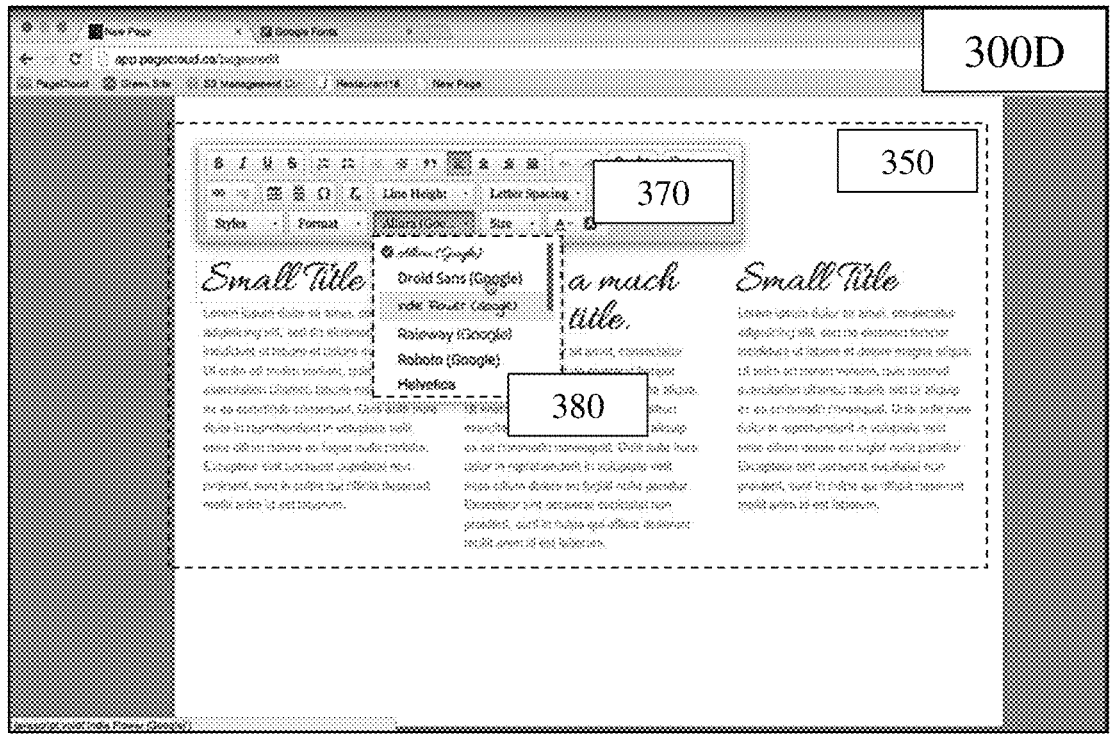
Figure 3D

Figure 5E
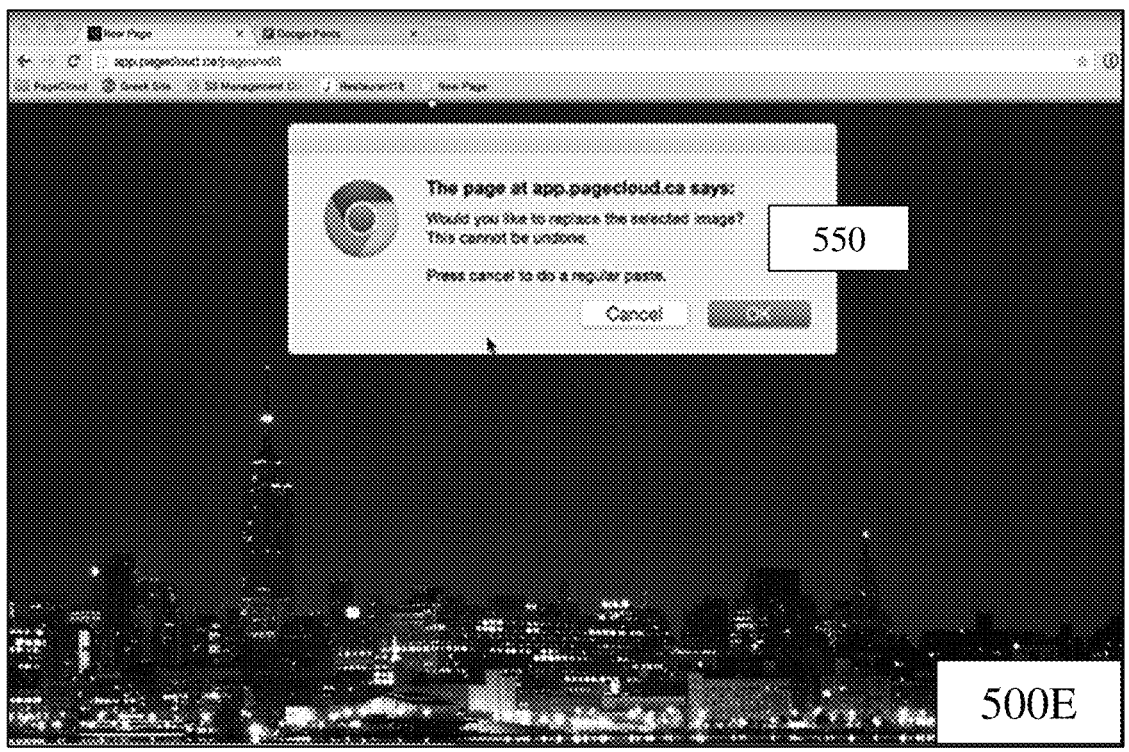
Figure 5F

Figure 8A
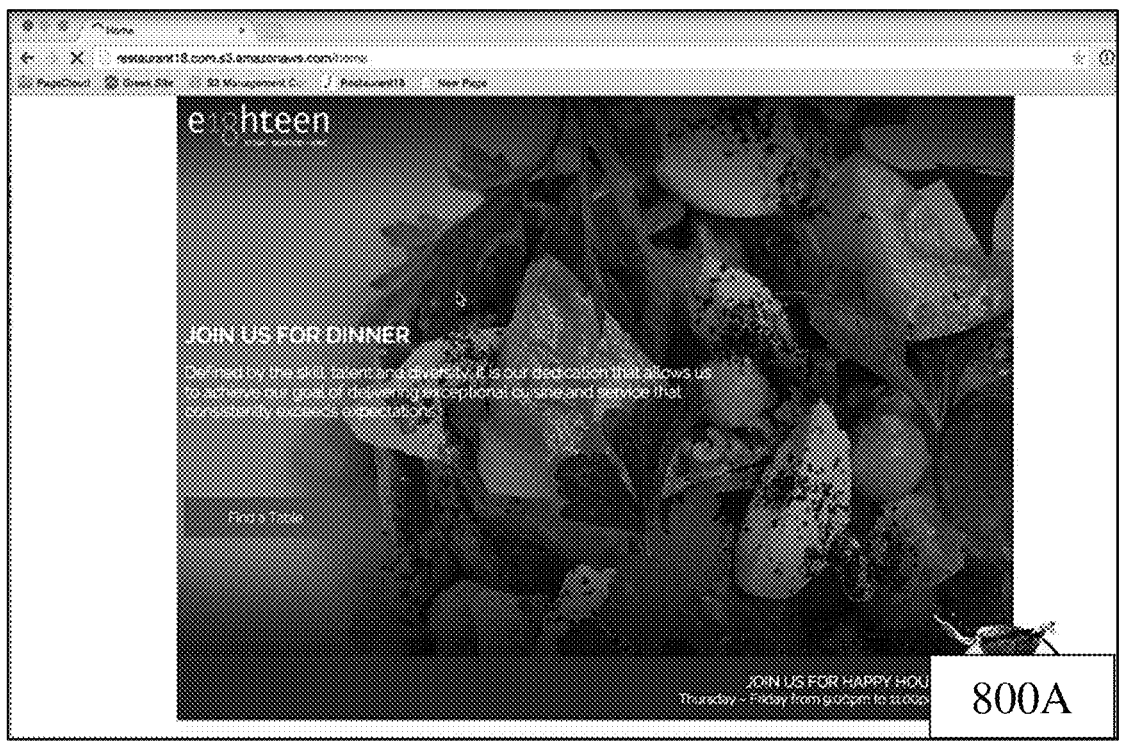
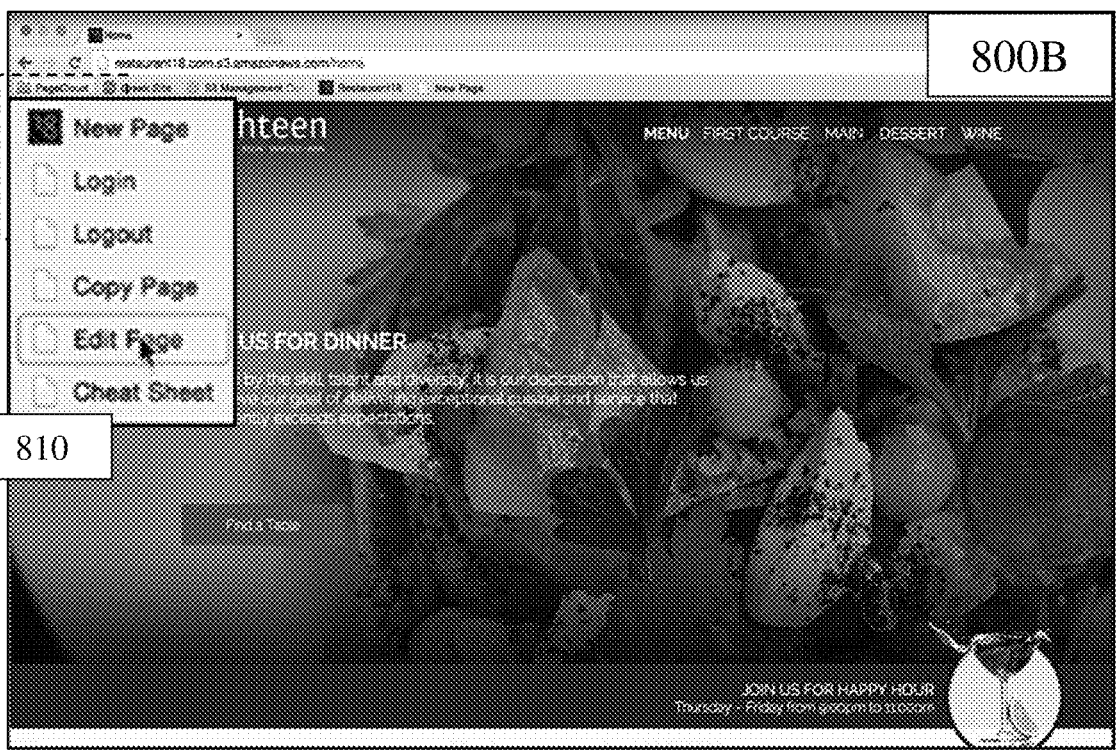
Figure 8B

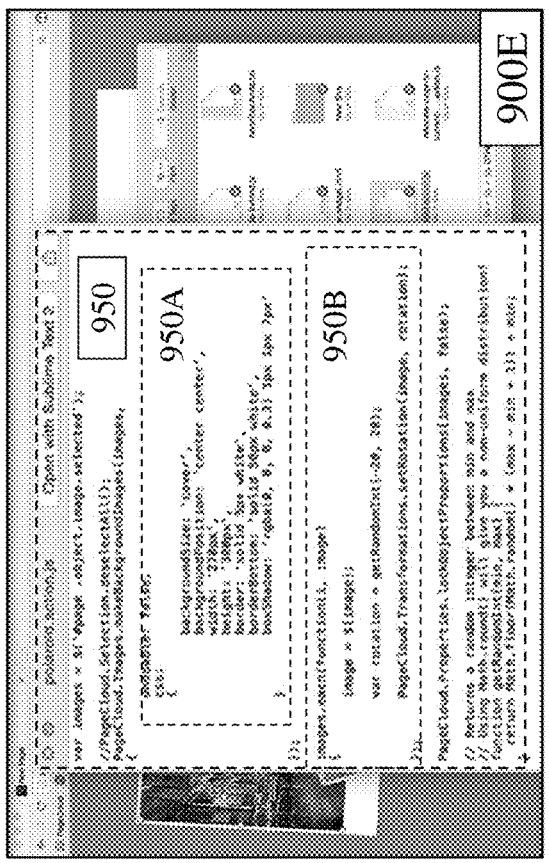
Figure 9E
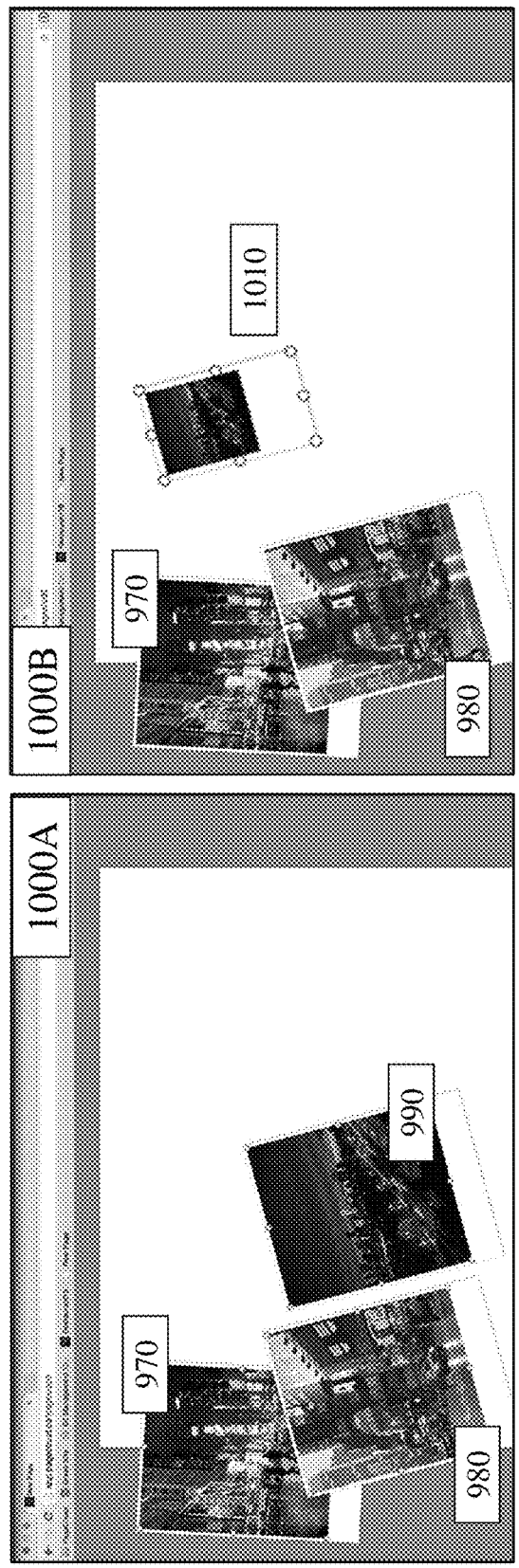
Figure 10B
Figure 10A

Figure 12C
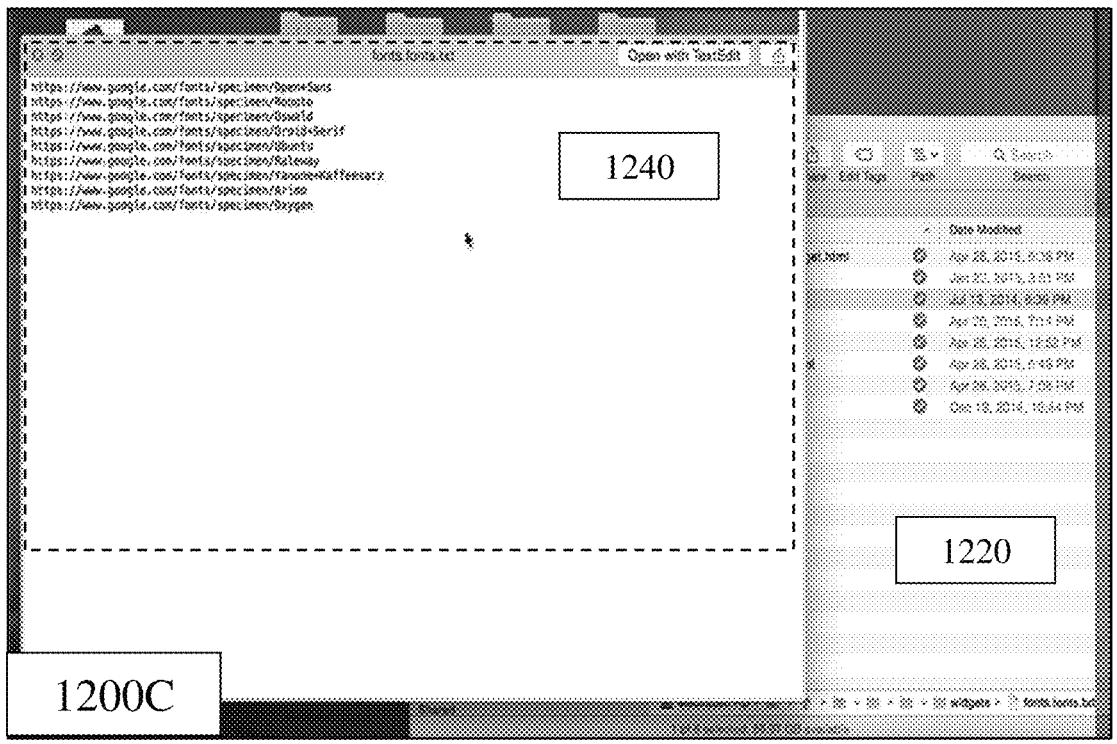
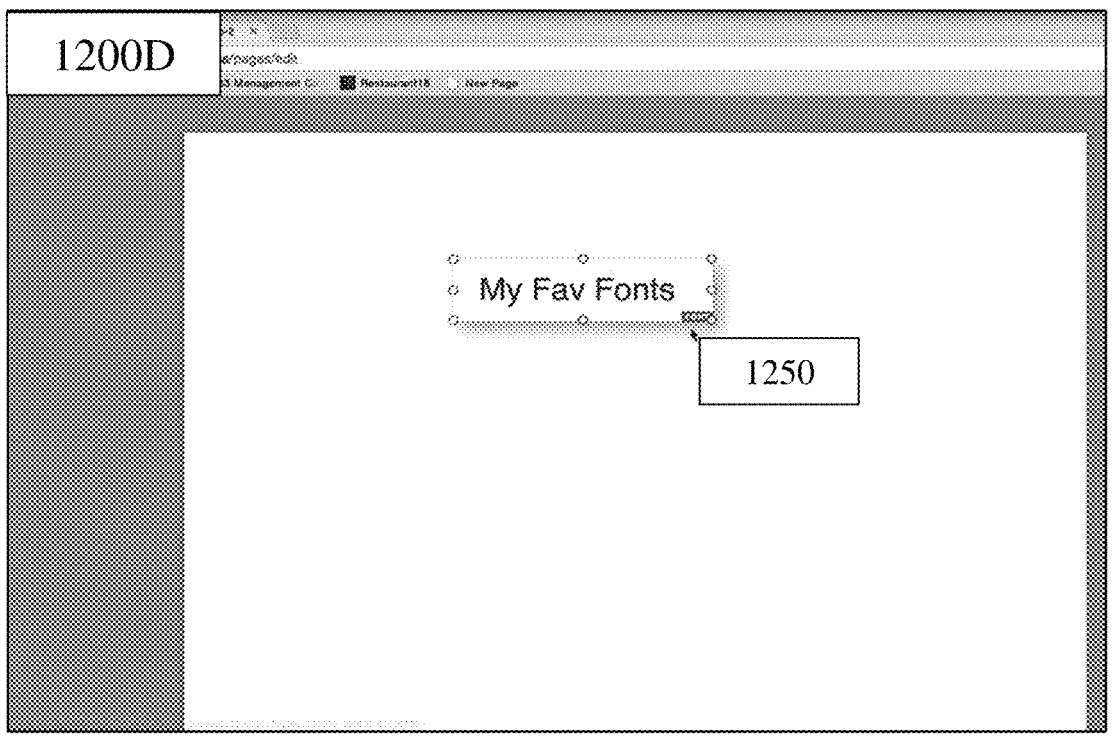
Figure 12D

Figure 12E
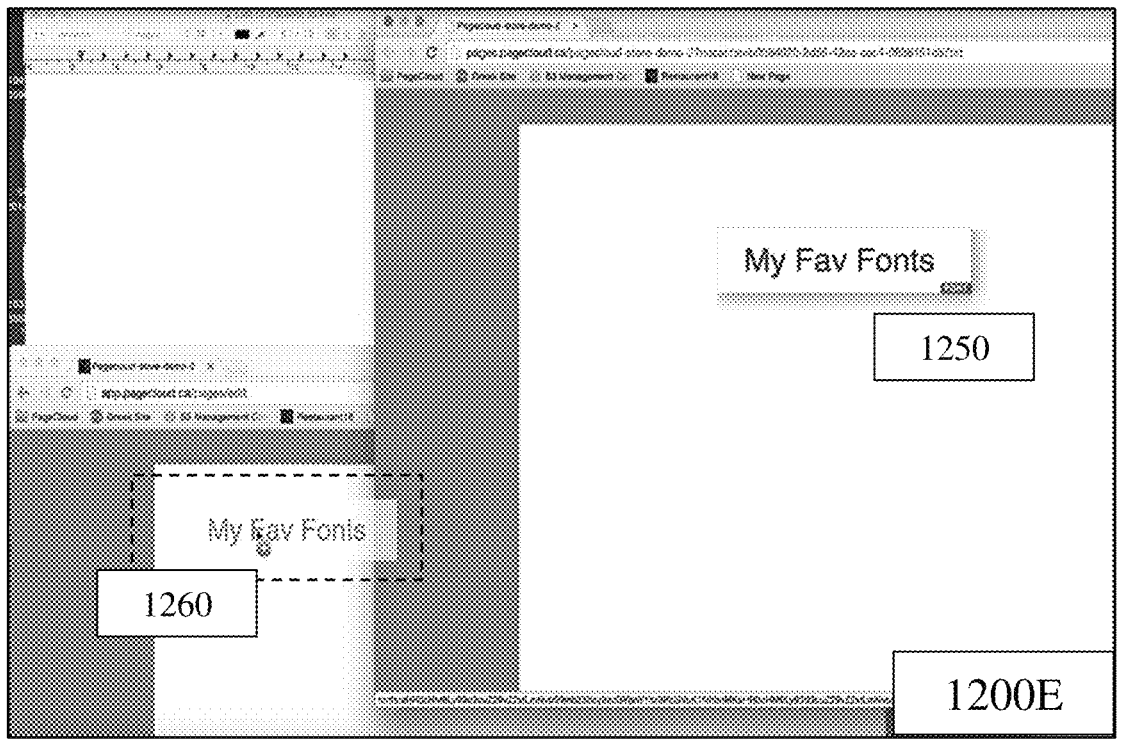
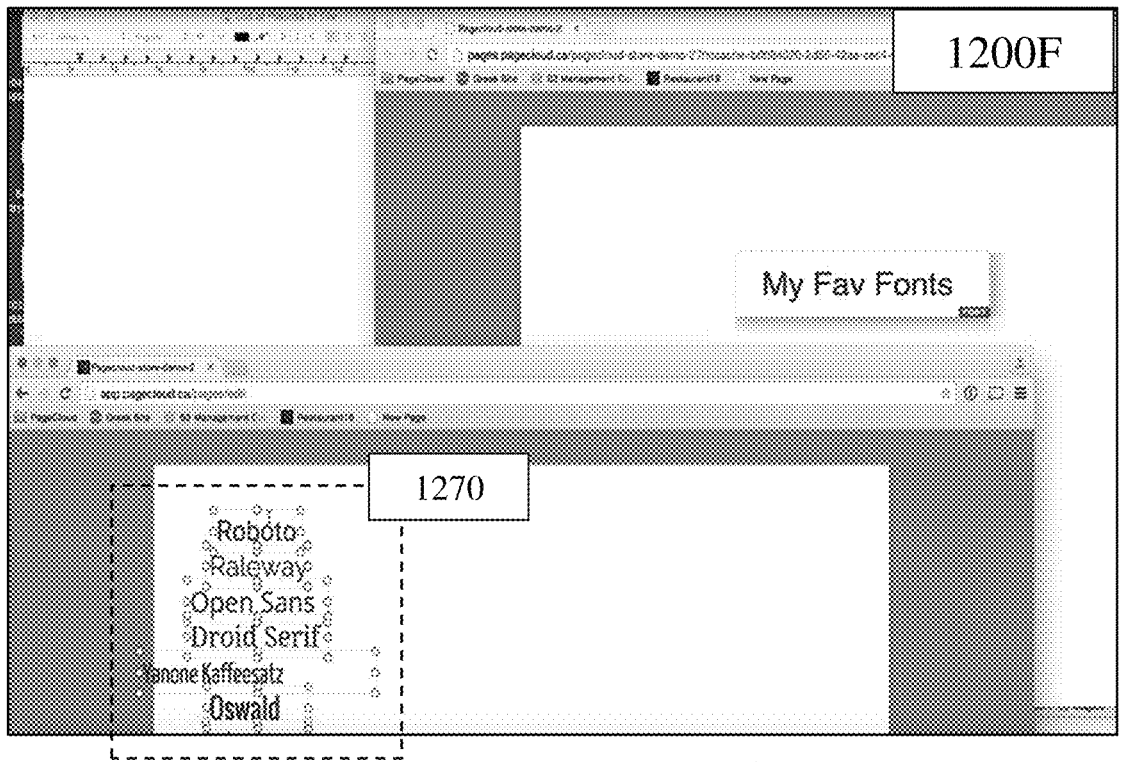
Figure 12F

Figure 15C
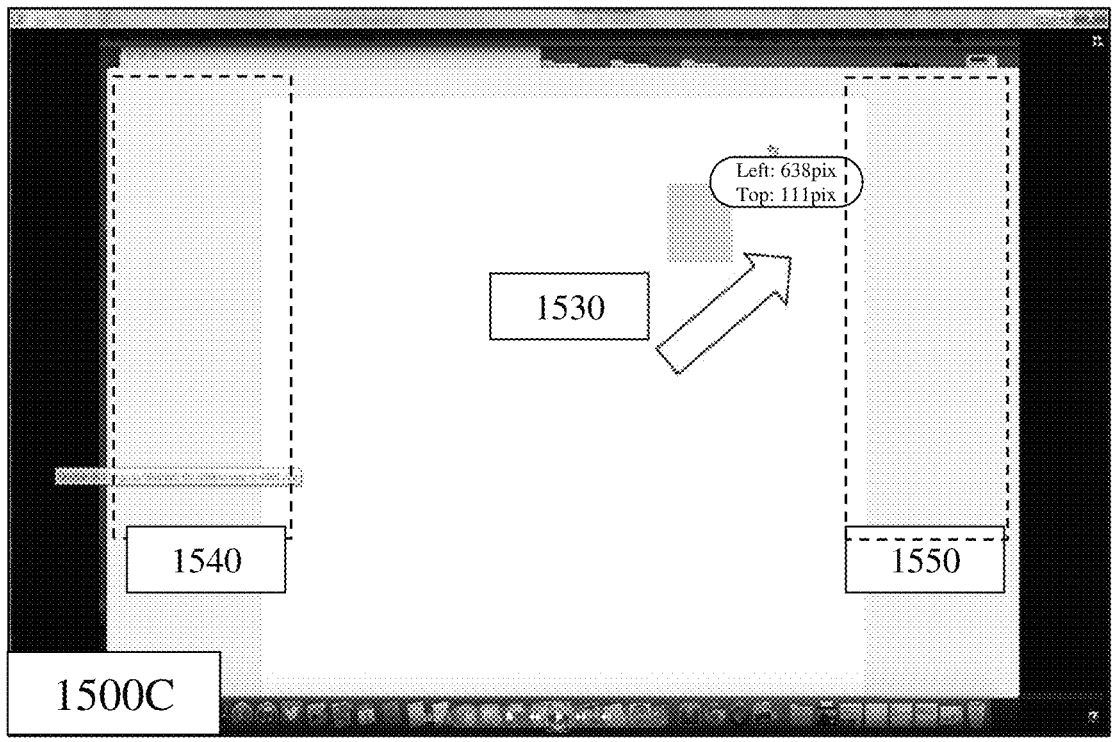
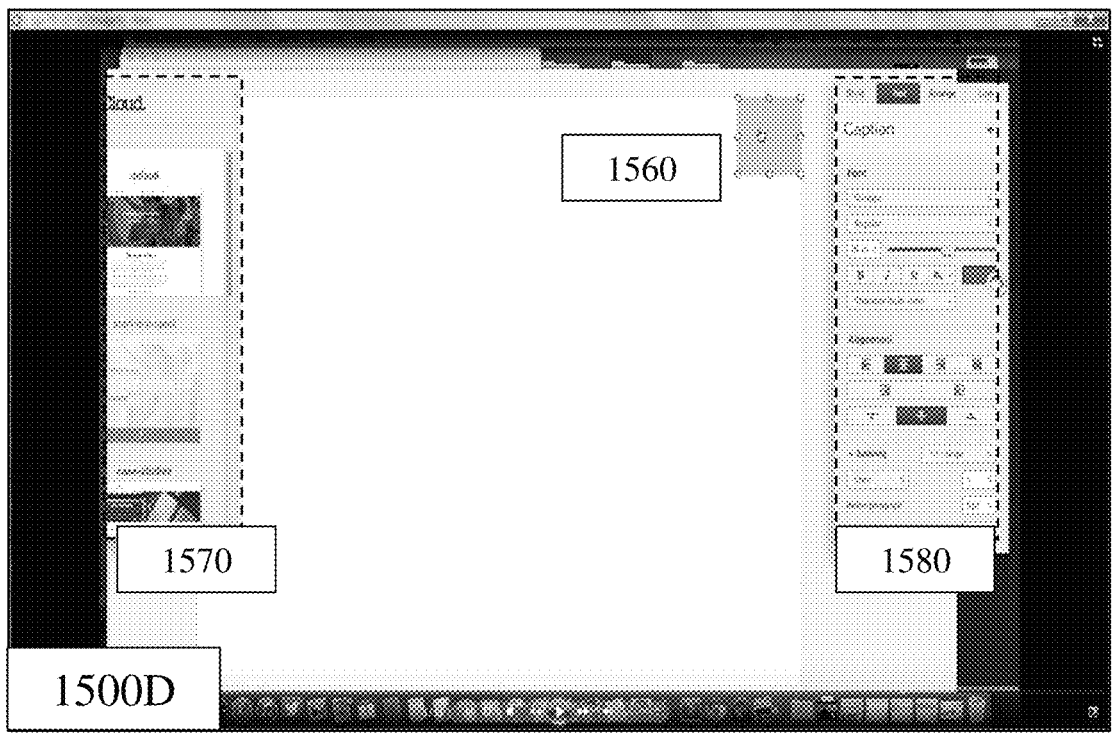
Figure 15D

METHODS AND SYSTEMS FOR WYSIWYG WEB CONTENT GENERATION

CROSS-REFERENCE TO RELATED APPLICATIONS

This application claims the benefit of priority from World Patent Application PCT/CA2016/000200 filed Jul. 28, 2016 entitled "Methods and Systems for WYSIWYG Web Content Generation" which itself claims priority from U.S. Provisional Patent Application 62/199,306 filed Jul. 31, 2015 entitled "Methods and Systems for WYSIWYG Web Content Generation", the entire contents of both being incorporated herein by reference.

FIELD OF THE INVENTION

This invention relates to Internet content generation and more particularly to improved tools for the acquisition, modification, and generation of webpages, webapps and websites.

BACKGROUND OF THE INVENTION

The Internet is a global system of interconnected computer networks that use the standard Internet protocol suite communication protocols, e.g. TCP/IP, to link several billion devices worldwide. It is essentially a network of networks that consists of millions of private, public, academic, business, and government networks, of local to global scope, that are linked by a broad array of electronic, wireless, and optical networking technologies. The Internet carries an extensive range of information resources and services, such as the inter-linked hypertext documents and applications of the World Wide Web (WWW), the infrastructure to support email, and peer-to-peer networks for file sharing and telephony.

Though the Internet has been widely used by academia since the 1980s, the commercialization of what was by the 1990s an international network resulted in its popularization and incorporation into virtually every aspect of modern human life. As of April 2014, approximately 3 billion people, nearly 40% of the world's human population have an Internet connection. Over the past thirty years most traditional communications media including telephone, music, film, and television are being reshaped or redefined by the Internet, giving birth to new services such as voice over Internet Protocol (VoIP) and Internet Protocol television (IPTV). Newspaper, book, and other print publishing are adapting to website technology, or are reshaped into blogging and web feeds. The Internet has enabled and accelerated new forms of human interactions through instant messaging, Internet forums, and social networking. Online shopping has boomed both for major retail outlets and small artisans and traders. Business-to-business and financial services on the Internet affect supply chains across entire industries.

The vast majority of user engagement with the Internet, especially for the average individual, is through webpages and websites. A website, is a set of related webpages served from a single web domain, and is hosted on at least one web server, accessible via a network such as the Internet or a private local area network through an Internet address known as a Uniform Resource Locator (URL). All publicly accessible websites collectively constitute the World Wide Web. Each webpage is a document, typically written in plain text interspersed with formatting instructions in a language, e.g. Hypertext Markup Language (HTML, XHTML). Webpages may incorporate elements from other websites with suitable markup anchors as well as links to other webpages on the same website or other websites, the latter being typically accessed via hypertext links.

In order to view information a user launches an application, often referred to as a web browser, and navigates to a webpage through a search or a stored link, its web address. The web browser rendering the page content according to its HTML markup instructions onto a display terminal wherein the content and HTML markup instructions have been transported with the Hypertext Transfer Protocol (HTTP), which may optionally employ encryption (HTTP Secure, HTTPS) to provide security and privacy for the user of the webpage content. The URLs of the pages organize them into a hierarchy, although hyperlinking between them conveys the reader's perceived site structure and guides the reader's navigation of the site which generally includes a home page with most of the links to the site's web content, and a supplementary about, contact and link page.

Some websites require a subscription to access some or all of their content. Examples of subscription websites include many business sites, parts of news websites, academic journal websites, gaming websites, file-sharing websites, message boards, web-based email, social networking websites, websites providing real-time stock market data, and websites providing various other services (e.g., websites offering storing and/or sharing of images, files and so forth).

However, irrespective of the content, the structure, the website, etc. every single webpage on every single website has had to be generated. Whilst, some webpages may display results from searches these search results are webpages or portions of webpages. With an estimated 100 billion plus webpages on over 100 million websites that is a vast amount of human resources applied to the design, layout, configuration of those webpages. At present creating a website generally involves two primary jobs, the web designer and web developer, who often work closely together on a website. The web designers are responsible for the visual aspect, which includes the layout, coloring and typography of a webpage and will typically have a working knowledge of using a variety of languages such as HTML, Cascading Style Sheets (CSS), JavaScript, PHP (a server-side scripting language) and Flash to create a site, although the extent of their knowledge will differ from one web designer to another. Particularly in smaller organizations one person will need the necessary skills for designing and programming the full webpage, while larger organizations may have a web designer responsible for the visual aspect alone. In other particular circumstances, other individuals may become involved during the creation of a website including, for example, graphic designers (to create visuals for the site such as logos, layouts and buttons), Internet marketing specialists (who help maintain web presence through strategic solutions targeting viewers), search engine optimizers (SEOs, who research/recommend website language to increase website visibility on search engines), Internet copywriters (to create the written content), and user experience (UX) designers (who address end-user design considerations).

As a result, establishing a website whilst being a major, often vital, element of an enterprise's or organization's strategy can be an expensive proposition which is not helped by the need to support both desktop and mobile users as well as potentially supporting multiple languages to address user's in different geographical regions. Due to the lower bandwidth, reduced display capabilities, and typically lower processor capabilities a mobile webpage/website is generally less complex and less graphically intensive than a desktop webpage/web site.

Accordingly, over the past decade whilst professional design tools for webpages/websites have improved a parallel development has occurred geared to the individual, the smaller enterprise, etc. wherein they can design and implement a website and its webpages through the use of templates that are pre-configured and remove the requirements of the user to understand web design and development tools. In many instances these are discrete third party services but increasingly these are bundled as part of an overall package from enterprises such as GoDaddy™, Wix™, and WordPress.com wherein the user can register an Internet domain, generate their website and have it hosted so that they do not need to worry about servers, scalability etc.

However, this leaves the user with essentially two options, the first with full creative control and flexibility is to exploit web developers and website development enterprises to generate exactly what they want. The second is to select a template from those available and work within its constraints. The former is typically suited to established enterprises that can justify the marketing budget and quantify the return on investment whilst the latter is typically employed by small and new enterprises, individuals, etc. to establish a web presence without incurring significant costs for unknown return on investment.

Accordingly, it would be beneficial to provide users with the ability to establish a webpage and/or website with a design that they want within a generation tool that they find easy and intuitive to use. The former, i.e. the generation tool, beneficially is the very same web browser that their users will view the webpage/website with whilst the latter, the intuitive and easy use, is the same features that they will be familiar with from word processing, graphics editors, etc.

It would be further beneficial for a user, when generating their webpage(s) and/or website(s) to be able to rapidly duplicate an existing webpage/website and then edit it to reflect the changes that they want. For example, a florist offering twenty floral arrangements may wish to have twenty webpages each essentially identical in theme and content with the variations for each particular arrangement's image, cost, and options. Similarly, a small local chain of restaurants may wish to establish a website for each location so that it reflects the neighbourhood it is within but have similar structure and many common elements. Accordingly, being able to easily copy a webpage, edit it, and save it would be beneficial.

It would be further beneficial for the user's edits, amendments, etc. to their webpage(s)/website(s) to be automatically and rapidly available online once they have completed them rather than awaiting their service provider's upload of modified content. It would be further beneficial for the user to be able to rapidly add extended features to their website such as videos, widgets etc.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to Internet content generation and more particularly to improved tools for the acquisition, modification, and generation of webpages, webapps and websites.

In accordance with an embodiment of the invention there is provided a method of replacing a font associated with an item of content by automatically detecting a change in a name of the font associated with the item of content within a document object model relating to the item of content.

In accordance with an embodiment of the invention there is provided a method of adding a target font to an item of web content comprising the steps of:
copying a predetermined portion of content from another item of web content with the target font;
pasting the predetermined portion of content to the item of web content; and
automatically establishing the target font and installing the target font as a result of the paste operation.

In accordance with an embodiment of the invention there is provided a method of adding a target font to an item of web content comprising the steps of:
dragging and dropping a widget onto the item of web content wherein the widget comprises a uniform resource locator (URL) identifying a source of the target;
automatically accessing the URL and installing the target font as a result of the drag and drop operation.

In accordance with an embodiment of the invention there is provided a method of adding a target font to an item of web content comprising the steps of:
receiving a trigger from a user;
generating a pop-up in response to the trigger comprising at least a field for the user to enter a name of the target font;
automatically searching the Internet for an instance of the target font; and installing the target font.

In accordance with an embodiment of the invention there is provided a method of replacing an image within an item content comprising:
selecting the image within the item of content;
detecting a drag and drop operation relating to a second image that places a predetermined portion of the second image over a predetermined portion of the image within the item of content; and automatically replacing the image within the item of content with the second image.

In accordance with an embodiment of the invention there is provided a method of adding an image to an item content comprising:
selecting the image within another item of content;
detecting a drag and drop operation relating to the image that places a predetermined portion of the image over a predetermined portion of the item of content; and
automatically amending a document object model of the item of content with data relating to the image extracted from another document object model associated with the other item of content.

In accordance with an embodiment of the invention there is provided a method comprising:
generating a bookmarklet relating to one or more actions a user can perform within a web content editing tool; and
displaying the bookmarklet to the user within a web browser absent an instance of the web content editing tool being open; and
detecting user selection of an action of the one or more actions within the bookmarklet; and
executing the user selected action upon web content currently displayed to the user within the web browser.

In accordance with an embodiment of the invention there is provided a method comprising:

establishing an action comprising script relating to a scripting language;
associating an icon relating to the action within a web browser; and
executing the action upon detecting insertion of the action into a web page open within the web browser.

In accordance with an embodiment of the invention there is provided a method comprising:
establishing an action comprising a predetermined portion of a document object model of a web page accessed by the user, wherein the predetermined portion of the document object model relates to one or more items within the web page selected by the user;
associating an icon relating to the action within a web browser; and
automatically inflating the action upon detecting insertion of the action into a different web page open within the web browser.

In accordance with an embodiment of the invention there is provided a method comprising:
presenting a palette to a user within a software application;
detecting movement of an item within content presented to the user with the software application; and
automatically relocating the palette when the movement has been completed such that the palette does not overlap the item.

In accordance with an embodiment of the invention there is provided a method comprising:
presenting an iframe to a user as part of an item of content also displayed to the user;
detecting an action by the user relating to the iframe; and
determining whether to allow the user to edit the iframe within the application presenting the item of content to the user.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 3A to 3D respectively depict loading and using a new font within a webpage by insertion of a widget into the webpage via a WCS-WCAP according to an embodiment of the invention;

FIGS. 5A to 5F respectively depict the direct insertion into a webpage of content through a paste action from another application via a WCS-WCAP according to an embodiment of the invention;

FIGS. 8A to 8C respectively depict the direct editing of a webpage via a WCS-WCAP menu within web browser according to an embodiment of the invention;

FIGS. 9A to 9E respectively depict the automatic execution of a widget dropped on a web page with selected content via a WCS-WCAP according to an embodiment of the invention;

FIGS. 10A to 10F respectively depict the generation of a widget relating to image manipulation within a web page via a WCS-WCAP according to an embodiment of the invention;

FIGS. 12A to 12G respectively depict the generation and application of a widget relating to font loading and use via a WCS-WCAP according to an embodiment of the invention;

FIGS. 15A to 15D respectively depict intelligent palettes within a WCS-WCAP according to an embodiment of the invention;

DETAILED DESCRIPTION

Figures 1A, 1B:
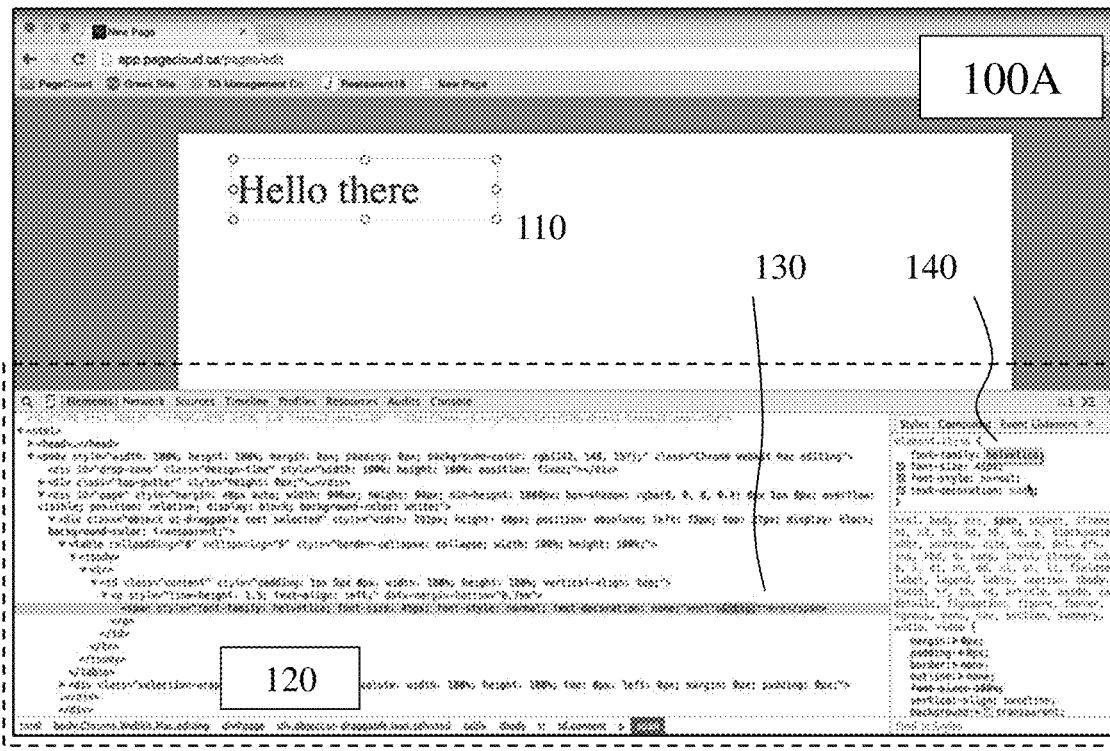
FIGS. 1A to 1C respectively depict changing a font within a webpage directly through editing the document object model via a web content system and web content application/platform (WCS-WCAP) according to an embodiment of the invention.

The present invention is directed to Internet content generation and more particularly to improved tools for the acquisition, modification, and generation of webpages, webapps and websites. The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and programming tools (with which computer programs are created). Generally, within the following description with respect to embodiments of the invention an application is generally presented in respect of software permanently and/or temporarily installed upon a PED and/or FED.

A "web application" (commonly referred to as a "web app" or "webapp") as used herein may refer to, but is not limited to, application software accessible by a user over a network such as the Internet or an intranet that runs in a web browser or is created in a browser-supported programming language, e.g. a combination of JavaScript, HTML and CSS, and relies upon a web browser to render the application executable. This includes webapps, but is not limited to, such as webmail, online retail sales, online auctions, social networks, social media, wikis, message boards, office software (e.g. word processors, online spreadsheets, and presentation tools), project management, computer-aided design, video editing, multimedia content presentation, point-of-sale applications.

A "web browser" (commonly referred to as a 'browser") as used herein may refer to, but is not limited to, a software application for retrieving, presenting and traversing information resources such as those on the World Wide Web and the Internet or accessible via web servers in an intranet, a private network, or files in file systems. An information resource being typically identified by a Uniform Resource Identifier/Uniform Resource Locator (URI/URL) and may be, for example, a webpage, a website, multimedia content, image content, text content, or other items of content. Hyperlinks present within information resources allow users easily to navigate their browsers to related information resources. This includes, but is not limited to, Firefox™ Internet Explorer™, Google Chrome™, Opera™, and Apple Safari™.

A "webpage" (or "web page") as used herein may refer to, but is not limited to, a web document that is suitable for the World Wide Web and a web browser. A web browser displays a webpage on a display, such as that associated with a PED and/or FED. A webpage is what displays, but the term also refers to a computer file, usually written in HTML or comparable markup language, whose main distinction is to provide hypertext that will navigate to other webpages via links. Web browsers coordinate web resources centered on the written webpage, such as style sheets, scripts and images, to present the webpage. On a network, a web browser can retrieve a webpage from a remote web server. On a higher level, the web server may restrict access to only a private network such as a corporate intranet or it provide access to the World Wide Web. On a lower level, the web browser uses the Hypertext Transfer Protocol (HTTP) to make such requests. A static webpage is delivered exactly as stored, as web content in the web server's file system, while a dynamic webpage is generated by a web application that is driven by server-side software or client-side scripting. Dynamic webpages help the browser (the client) to enhance the webpage through user input to the server. A webpage is essentially a document, typically written in plain text interspersed with formatting instructions of HTML and/or XHTML either discrete or incorporating elements from other websites via suitable markup anchors.

A "website" (also known as "web site" or simply "site") as used herein may refer to, but is not limited to, a set of related webpages served from a single web domain. A website is hosted on at least one web server, accessible via a network such as the Internet or a private local area network through a URL. All publicly accessible websites collectively constitute the World Wide Web. The webpages of a website are Webpages are accessed and transported with the Hypertext Transfer Protocol (HTTP), which may optionally employ encryption (HTTP Secure, HTTPS) to provide security and privacy for the user of the webpage content. The user's application, often typically a web browser, renders the page content according to its HTML markup instructions onto a display terminal. The webpages (or simply pages) are accessed and transported with the Hypertext Transfer Protocol (HTTP), which may optionally employ encryption (HTTP Secure, HTTPS) to provide security and privacy for the user of the webpage content. The user's application, typically a web browser, renders the page content according to its HTML markup instructions onto a display terminal. The webpages (or simply pages) of a website can usually be a single URL, commonly referred to as the web address. The URLs of the webpages organize the webpages into a hierarchy, although hyperlinking between them conveys the reader's perceived site structure and guides the reader's navigation of the site which generally includes a home page with most of the links to the site's web content. Each webpage may also be accessed directly through its unique URL. Examples of websites include, but are not limited to, free websites, subscription websites, business websites, news websites, academic journal websites, gaming websites, file-sharing websites, message boards, web-based email, social networking websites, service provider websites, enterprise websites, user websites, and websites offering storing and/or sharing of images, files, etc.

The "cloud" as used herein may refer to, but is not limited to "cloud computing" which relates to distributed computing over a network, where a program or application may run on many connected computers at the same time. Generally, it refers to computing hardware machines or groups of computing hardware machines commonly referred as servers that are connected through a communication network such as the Internet, an intranet, a local area network (LAN) or wide area network (WAN). Accordingly, "the cloud" or "in the cloud" is metaphor for the Internet where software, platforms and infrastructure are offered/sold "as a service", i.e. remotely through the Internet. Common models of cloud computing service are known as software as a service (SaaS), platform as a service, and infrastructure as a service. These cloud services may be offered in a public, private or hybrid network.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Event-Brite, Facebook, Flickr, Google+, Instagram, LinkedIn, Pinterest, Tumblr, Twitter, Vimeo, Vine, and YouTube; as well as Nexopia, Badoo, Bebo, Delphi, Glocals, Hi5, Hyves, iWiW, Mixi, Nasza-Klasa, Skyrock, Soup, The Sphere, StudiVZ, Tagged, Tuenti, VKontakte, XING, Orkut, Mxit, Cyworld, renren, weibo and Wretch.

"Social media" or a "social media service" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals whose biometric data may be, but not limited to, monitored, acquired, stored, transmitted, processed and analysed either locally or remotely to the user wherein by their engagement with a service provider, third party provider, enterprise, social network, social media etc. via a dashboard, web service, website, software plug-in, software application, graphical user interface acquires, for example, electronic content. This includes, but is not limited to, private individuals, employees of organizations and/or enterprises, members of community organizations, members of charity organizations, men, women, children, and teenagers.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as HTML, CSS, JavaScript, XML, SVG, CSV, MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Webpage. Webpages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

Reference to a "widget" as used herein may refer to, but is not limited to, a relatively simple and easy-to-use software application or component made for one or more different software platforms. As such a widget may automatically or within limited user interaction perform one or more tasks and act as a transient and auxiliary application. Such widgets may include, but not be limited, graphical control elements (graphical user interface (GUI) widgets) that provide reusable modular components that can be used in isolation or combined to build a more complex application.

Within the description below in respect of embodiments of the invention reference is made to a webpage, a webapp, a website, webpages, webapps, and websites. Whilst these terms are generally employed with the associated meanings it would be evident to one skilled in the art that in many aspect of the World Wide Web, Internet, or private networks exploiting these elements that in other instances these terms may be interchangeable and/or multiple terms may apply to a single item. For example, a webapp that displays a single webpage may accordingly if accessed through a URL be also termed a website as may the single webpage. Accordingly, within the description below the use of such terms should be viewed to the fullest/broadest extent through the interchangeability within the art of such terms and to what they relate.

Reference to a "Document Object Model" (DOM) as used herein may refer to, but is not limited to, a cross-platform and language-independent convention for representing and interacting with objects in HyperText Markup Language (HTML), Extended HTML (XHTML), and Extended Markup Language (XML) documents. For example, a DOM may depict nodes organized in a tree structure, called the DOM tree, wherein the objects in the DOM tree may be addressed and manipulated by using methods on the objects. Typically, the public interface of a DOM is specified in its application programming interface (API).

A "bookmarklet" as used herein may refer to, but not be limited to, a bookmark stored within a web browser that contains commands, usually JavaScript commands, that add new features to the browser. Bookmarklets are generally Unobtrusive JavaScripts stored as the URL of a bookmark in a web browser or as a hyperlink on a web page. Bookmarklets are usually JavaScript programs and regardless of whether a bookmarklet utility is stored as a bookmark or hyperlink, it adds one-click functionality to a browser or web page. When clicked, a bookmarklet may performs one of a wide variety of operations, such as running a search query or extracting data from a table or providing a menu of options. For example, clicking on a bookmarklet after selecting text on a webpage could run an Internet search on the selected text and display a search engine results page.

Within the following descriptions in respect of FIGS. 1 through 18 and the specification in general reference is made to web content systems and web content applications/platforms (WCS-WCAPs). A WCS-WCAP as used herein may refer to, but is not limited to, a software application in execution in conjunction with a web browser allowing a user to perform actions upon web page content including, but not limited to, access, edit, modify, amend, add, delete, format, and re-format. A WCS-WCAP may retrieve, present and traverse information resources on the World Wide Web (WWW) as well as that accessible to the user locally or through one or more networks. As such a WCS-WCAP may include, but not be limited to, a discrete software application in execution upon a PED and/or FED wherein a browser is opened upon the PED and/or FED, a browser plug-in, and an application within which a browser may be opened.

Within the embodiments of the invention below these are intended to, where feasible, provide the user with a What You See is What You Get (WYSIWIG) toolset allowing the user to interact with the web page/web content they are working upon in an intuitive manner exploiting commands, tools, etc. familiar to them from a variety of software tools today. However, some extensions of the inventive concepts and knowledge of a hypertext markup language (HTML) may provide additional ease of use for those users with such knowledge. It would be evident that embodiments of the invention may also not be WYSIWYG in varying degrees. However, common to many of the embodiments of the invention is that the web content being worked upon by the user is immediately "published" and accessible online by other users when the user closes the content or exits the WCS-WCAP. As such embodiments of the invention present elements of a WCS-WCAP that typically replaces two or more applications within the prior art wherein content creation, image generation, web page generation, and web publishing are separate software tools with particular characteristics and requirements.

Figure 1C:
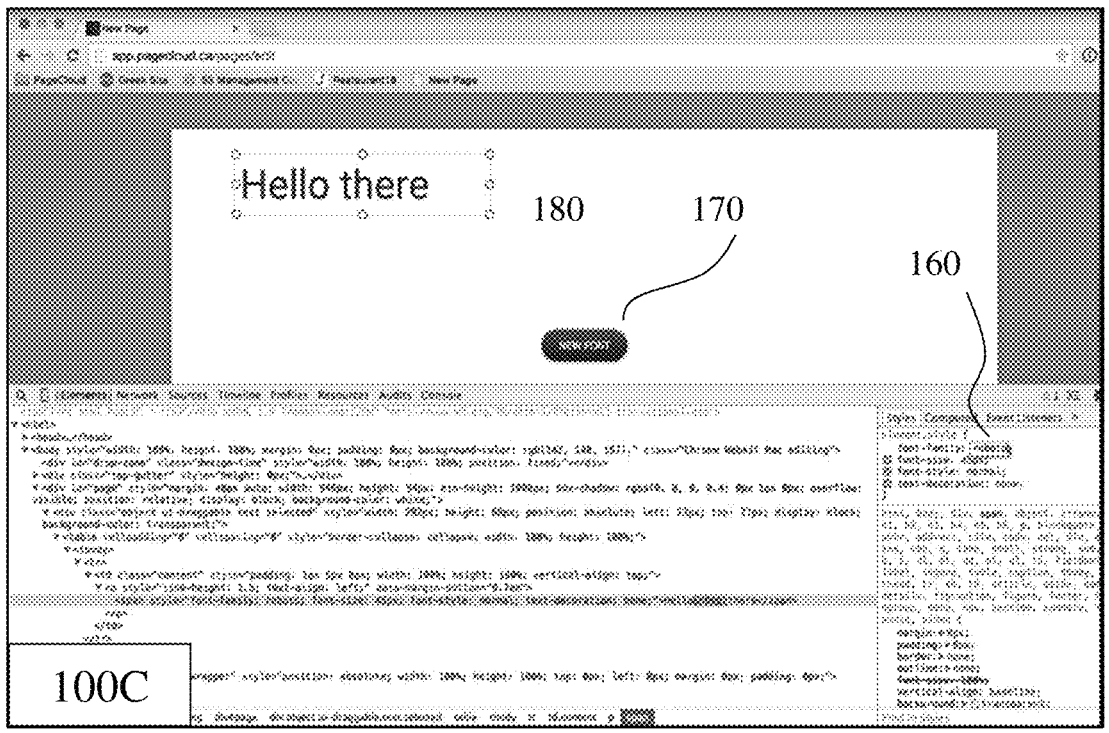

Now referring to FIGS. 1A to 1C respectively there are depicted first to third screenshot images 100A to 100C relating to a user changing a font within a webpage directly through editing the document object model (DOM) via a WCS-WCAP according to an embodiment of the invention. Accordingly, as depicted:

First screenshot image 100A in FIG. 1A, wherein the user has opened the web page within the WCS-WCAP, selected an item of text 110 "Hello there" and then selected to display its DOM which is depicted as region 120 such that the portion of the DOM relating to the text 110 is indicated by bar 130 and from style field 140 is depicted as "Helvetica" font;

Second screenshot image 100B in FIG. 1B, wherein the user has started to re-type style field 140 as partial field 150 "robo"; and Third screenshot image 100C in FIG. 1C, wherein the user has finished typing the name of the font they wanted in new field 160, in this instance "roboto", which as it was not a supported font at this point has triggered the WCS-WCAP to search one or more online font repositories and load the font, as indicated by pop-up icon 170 "NEW FONT", wherein the item of text is now displayed as new text 180 in the new font.

Accordingly, the WCS-WCAP according to an embodiment of the invention automatically monitors the user's actions within the DOM and triggers actions to be executed in background automatically and completed. In this manner the process of selecting a new font for an item of text was reduced through the embodiment of the invention to typing the new font name in the DOM for the user. The WCS-WCAP in contrast identified the font as not installed, located it, installed it, and applied it. Depending upon the system the WCS-WCAP is operating upon, network access, etc. this can be performed within a fraction of a second and be nearly imperceptible to the user.

Figure 2A:
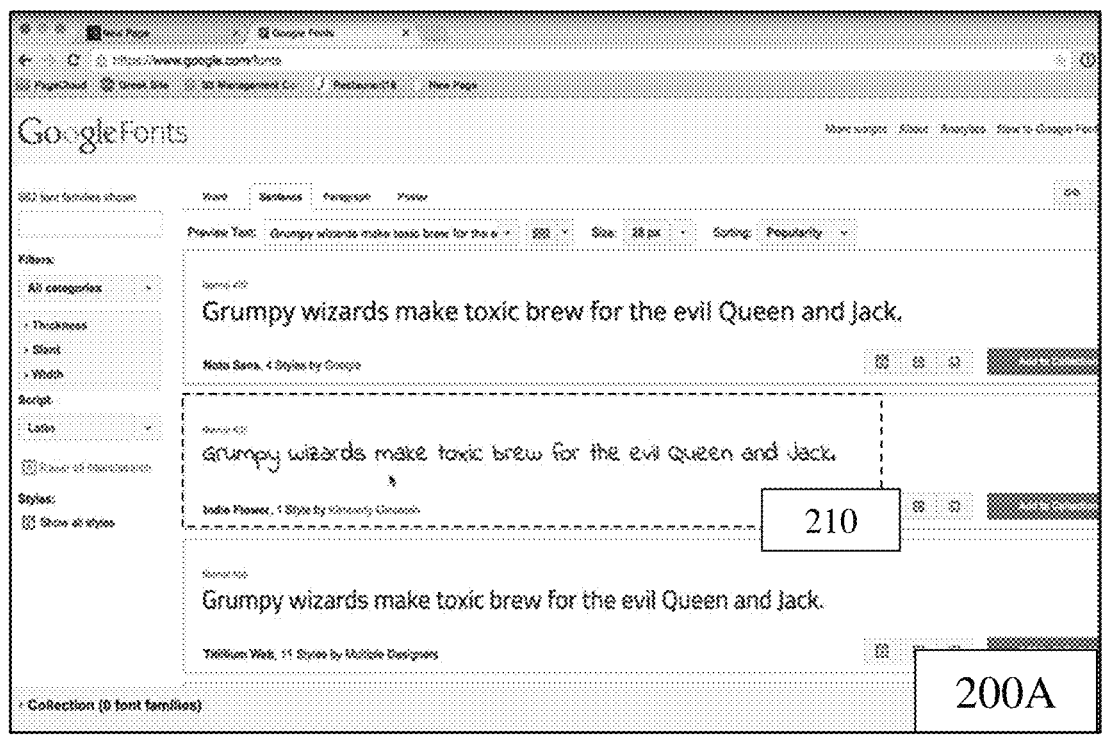
FIGS. 2A to 2C respectively depict loading and using a new font within a webpage by directly copying and pasting content from another webpage via a WCS-WCAP according to an embodiment of the invention.
Figure 2B:
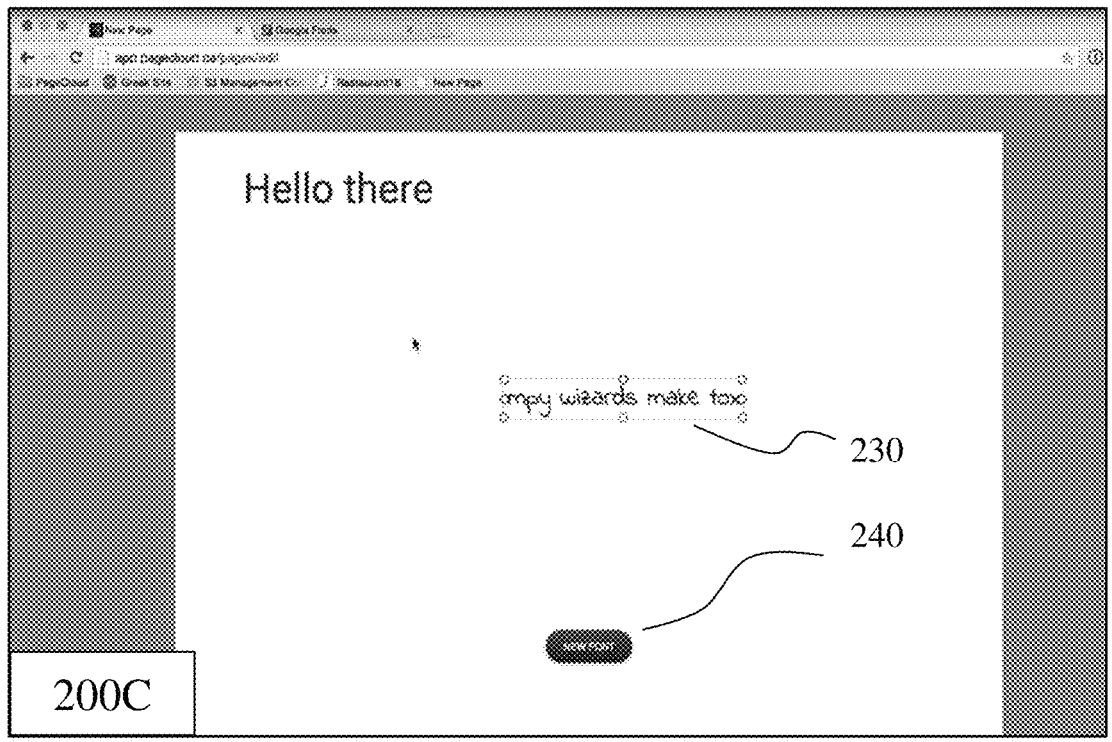
Figure 2C:
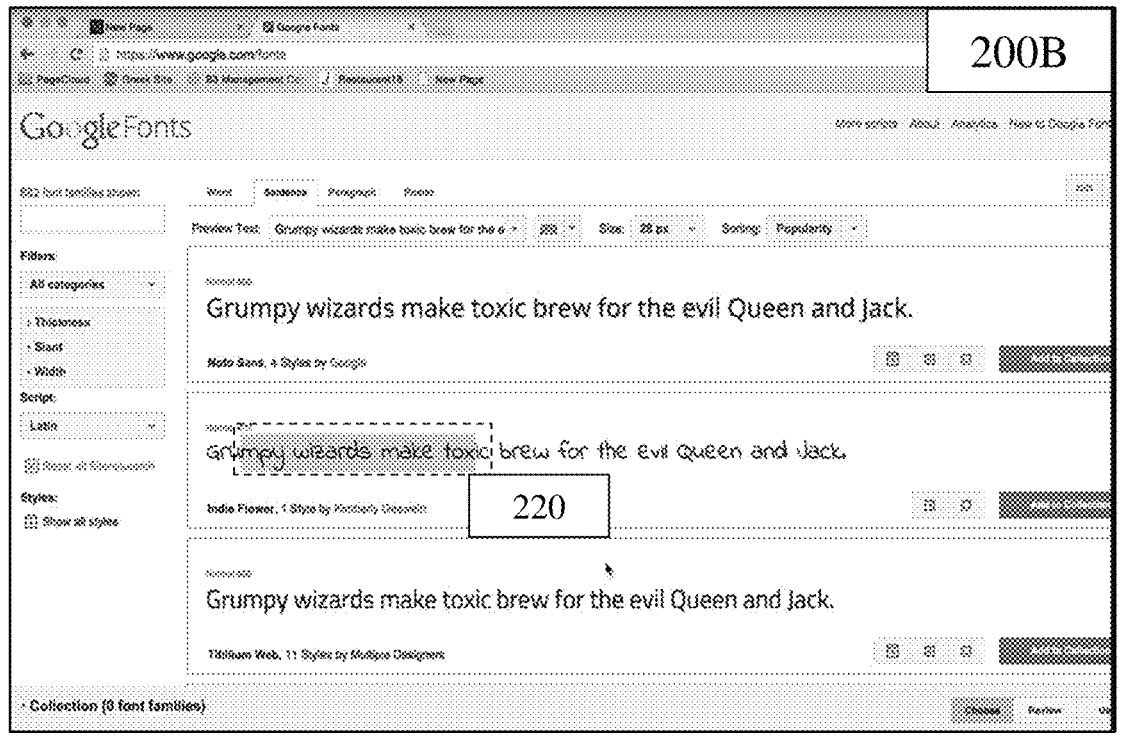

Now referring to FIGS. 2A to 2C there are depicted first to third screenshot images 200A to 200C relating to loading and using a new font within a webpage by directly copying and pasting content from another webpage via a WCS-WCAP according to an embodiment of the invention. Accordingly, as depicted:

First screenshot image 200A in FIG. 2A, wherein the user in establishing that they want to use a new font within a webpage being created and/or edited (not depicted for clarity) has opened a new browser window whilst exploiting WCS-WCAP and navigated to a font library, in this instance Google™ fonts and scrolled through to find font 210 that they wish to employ;

Second screenshot image 200B in FIG. 2B, wherein the user selects and copies a portion 220 of the indicated text in the font they want; and Third screenshot image 200C in FIG. 2C, wherein the user pastes the selected/copied portion 220 as new text 230 within the webpage they are working within wherein the WCS-WCAP identifies the font as a new font through pop-up icon 240 "NEW FONT", wherein the item of text is now displayed as new text 230 in the new font.

Accordingly, the WCS-WCAP according to an embodiment of the invention automatically monitors the user's actions within the other window and as it knows from the DOM associated with the text copied its properties it can trigger actions to be executed in background automatically and completed. In this manner the process of selecting a new font for an item of text was reduced through the embodiment of the invention to finding an item of text in the new font, copying it, and pasting it. The WCS-WCAP in contrast identified the font as it was copied, identified it as not installed, installed it, and applied it. Depending upon the system the WCS-WCAP is operating upon, network access, etc. this can be performed within a fraction of a second and be nearly imperceptible to the user.

Within the embodiments of the invention described in FIGS. 1A through 2C the focus has been to the automation and simplification of task for a user within a WYSIWYG web content editor. As soon as the user closes the web content, saves it, exits the WCS-WCAP etc. then the modified content is available online without any additional publishing, formatting etc. It would be evident that in some embodiments of the invention the user may need to acquire rights to a font in order to access it and exploit it. In some embodiments of the invention the WCS-WCAP may maintain a list of repositories, such as font foundries, font resources that the user can access together with the required login and access credentials or it may preferentially search resource repositories prior to accessing those requiring registration and/or purchase or extracting directly free of charge. In the example in FIGS. 2A to 2C the resource may have required registration and/or payment wherein these processes may be automatically performed as the user (a) accesses the site initially then their registration process is completed and (b) as the user copies an item then the billing/payment process proceeds automatically. Optionally, the user may be prompted to complete one or more of these steps.

Figure 3A:
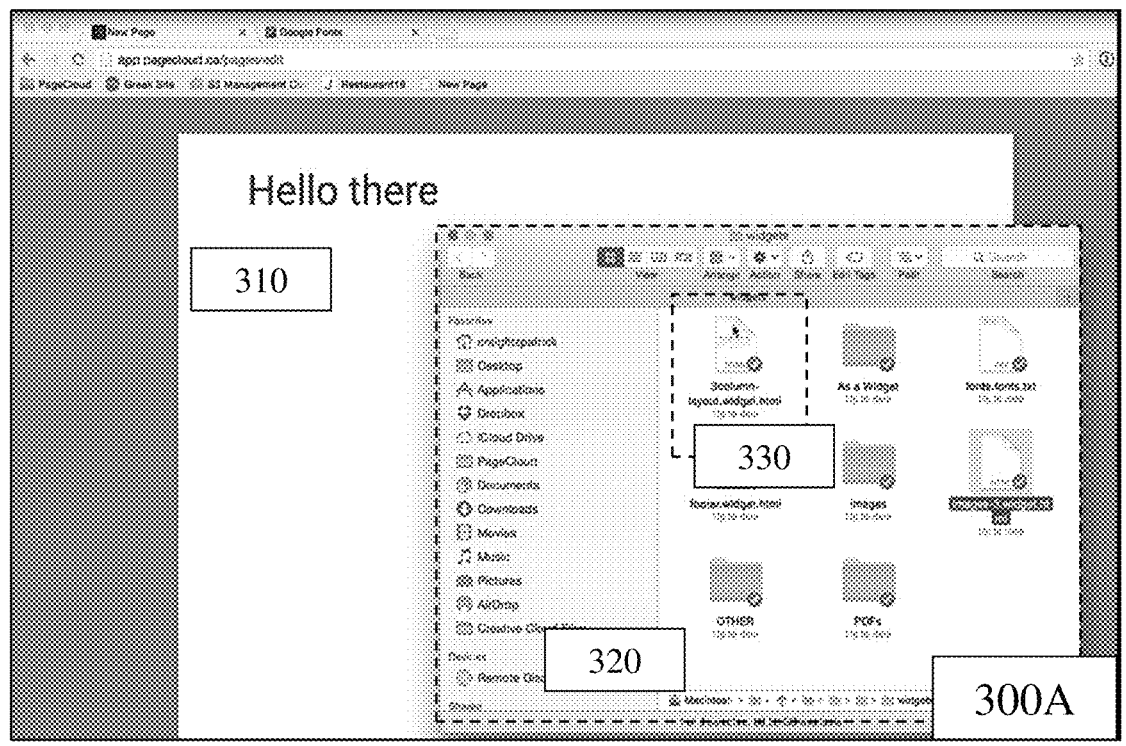
Figure 3B:
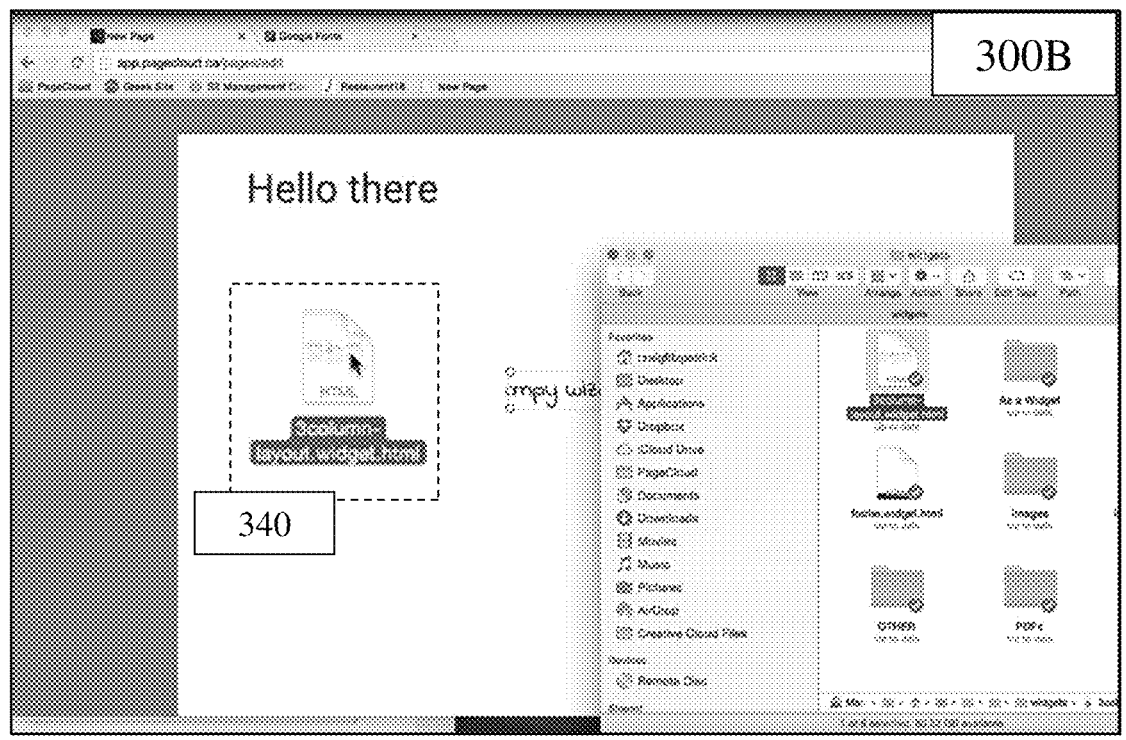

FIG. 3 there are depicted first to fourth screenshot images 300A to 300D relating to loading and using a new font within a webpage by insertion of a widget into the webpage via a WCS-WCAP according to an embodiment of the invention. Accordingly, there are depicted:

First screenshot image 300A in FIG. 3A; wherein the user has accessed a webpage 310 and been working upon it wherein they have then accessed a widget folder 320 upon their PED and/or FED (although this may also be a remotely accessed widget folder or online retail source of widgets in other embodiments of the invention) and selected widget 330 "3 column-layout.widget.html";

Second screenshot image 300B in FIG. 3B; wherein the user has not dropped the selected widget 330 onto the webpage as active widget 340;

Third screenshot image 300C in FIG. 3C; wherein the active widget 340 dropped onto the webpage 320 has now executed and generated a 3 column section 350 with header and loaded 3 new fonts; and Fourth screenshot image 300D in FIG. 3D; wherein a pop-up palette 370 associated with the text within 3 column section 350 displays a list of fonts 380 including the newly installed "Droid Sans", "Indie Flower" and "Raleway".

Accordingly, in FIGS. 3A to 3D the focus of embodiments of the invention is the automation and simplification of a task for a user within a WYSIWYG web content editor, in this instance establishing a 3 column layout with header using 3 different fonts. As within other embodiments of the invention as the user closes the web content, saves it, exits the WCS-WCAP etc. then the modified content is available online without any additional publishing, formatting etc. Accordingly, a team may work on web content collaboratively prior to its open publication or a user may rapidly amend an element to add information with re-formatting. It would be evident that in some embodiments of the invention the user may need to acquire rights to a font, fonts and/or the widget(s) in order to access and exploit it/them. In some embodiments of the invention the WCS-WCAP may maintain a list of repositories, such as widget libraries, widget foundries, font foundries, font resources that the user can access together with the required login and access credentials or it may preferentially search resource repositories prior to accessing those requiring registration and/or purchase or extracting directly free of charge. In the example in FIGS. 3A to 3D the resource may have required registration and/or payment for the widget and rights to its associated fonts wherein these processes may be automatically performed as the user (a) accesses the site initially then their registration process is completed and (b) as the user copies an item then the billing/payment process proceeds automatically. Optionally, the user may be prompted to complete one or more of these steps.

Figure 4A:
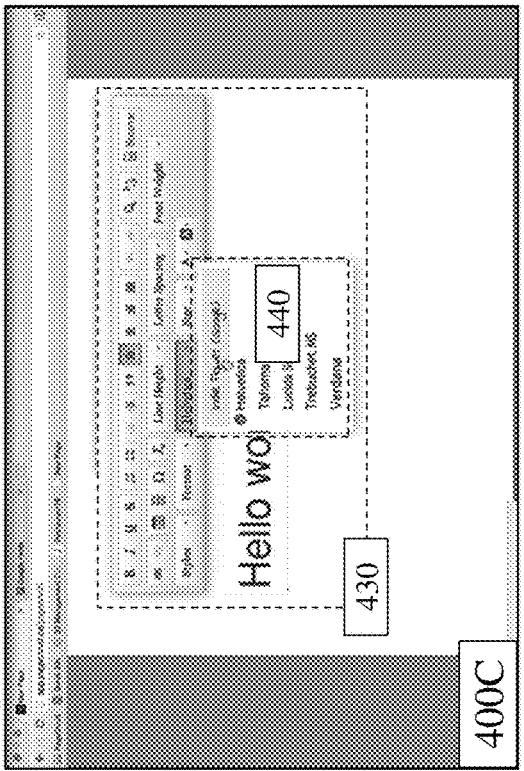
FIGS. 4A to 4C respectively depict loading and installing a new font via a hotkey launching an Internet search via a WCS-WCAP according to an embodiment of the invention.
Figure 4C:
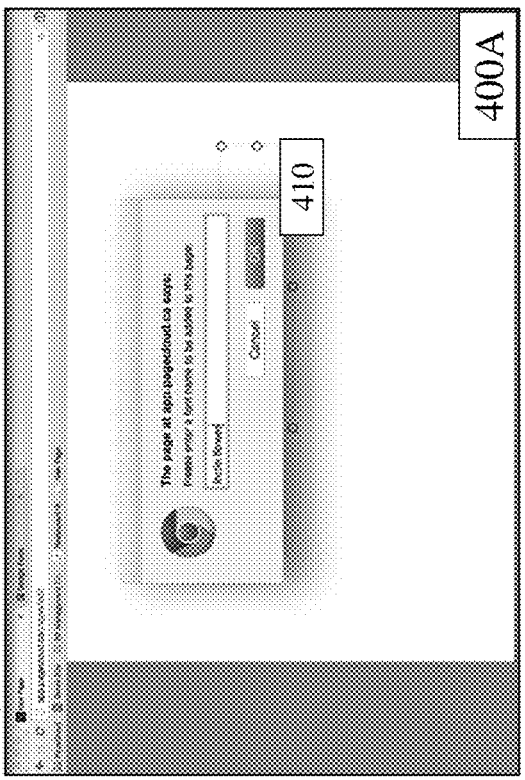
Figure 4B:
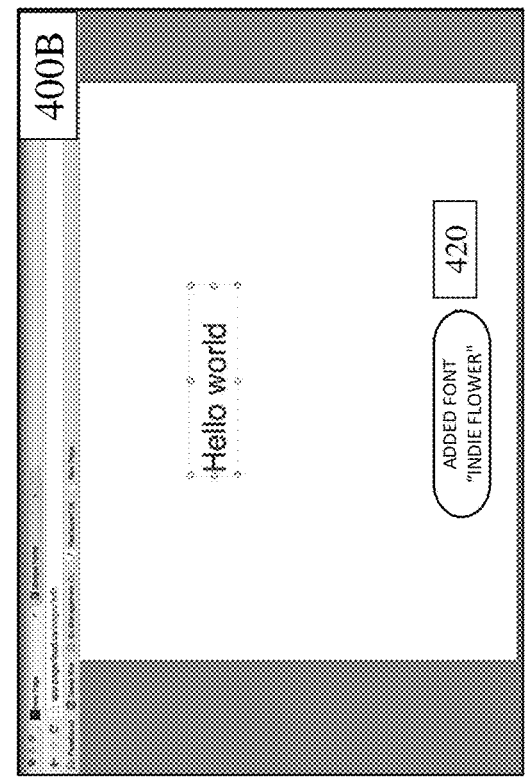

Referring to FIGS. 4A to 4C there are depicted first to third screenshot images 400A to 400C relating to loading and installing a new font via a hotkey launching an Internet search via a WCS-WCAP according to an embodiment of the invention. Accordingly, there are depicted:

First screenshot image 400A in FIG. 4A; wherein the user has selected a hot key function thereby triggering font pop-up 410 which prompts the user to enter the name of a font they wish to access;

Second screenshot image 400B in FIG. 4B; wherein after the user has entered and hit "OK" in first screenshot image 400A the WCS-WCAP has, in common with the process described within FIGS. 1A to 1C, located and installed the identified font as evident from notification icon 420; and Third screenshot image 400C in FIG. 4C; wherein the user has accessed a palette 430 for use during editing the web content they are working upon and within the list of accessible fonts 440 is now presented with "Indie Flower" as an option.

Figure 5C:
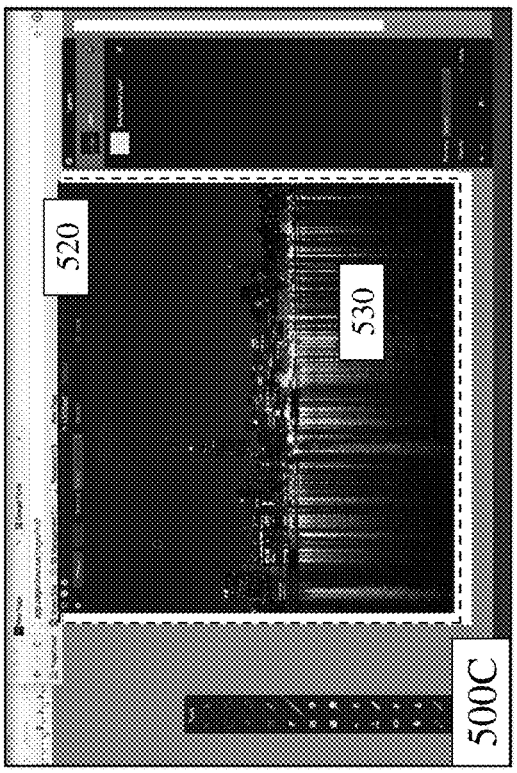
Figure 5D:
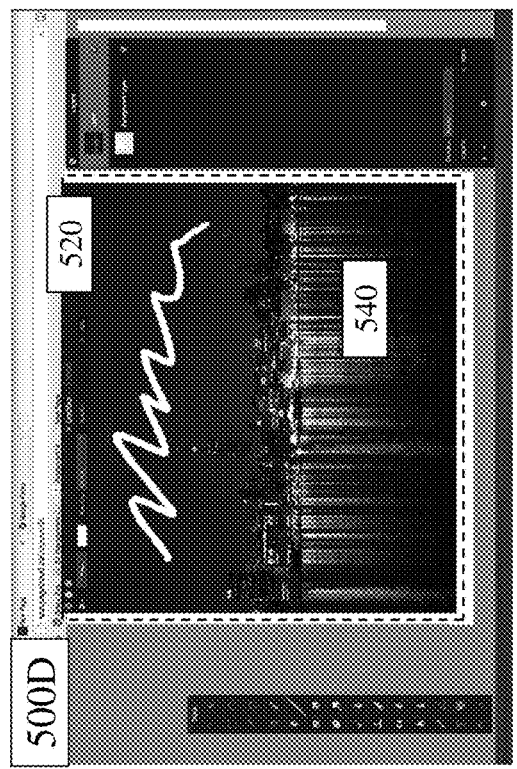
Figure 5A:
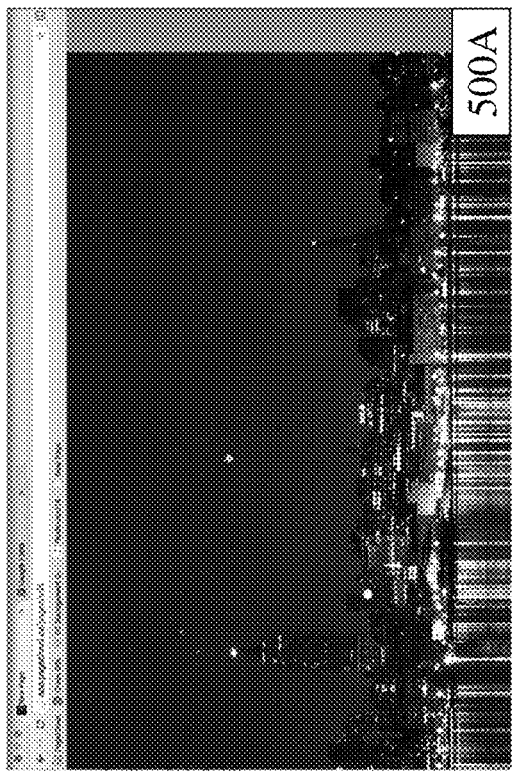
Figure 5B:
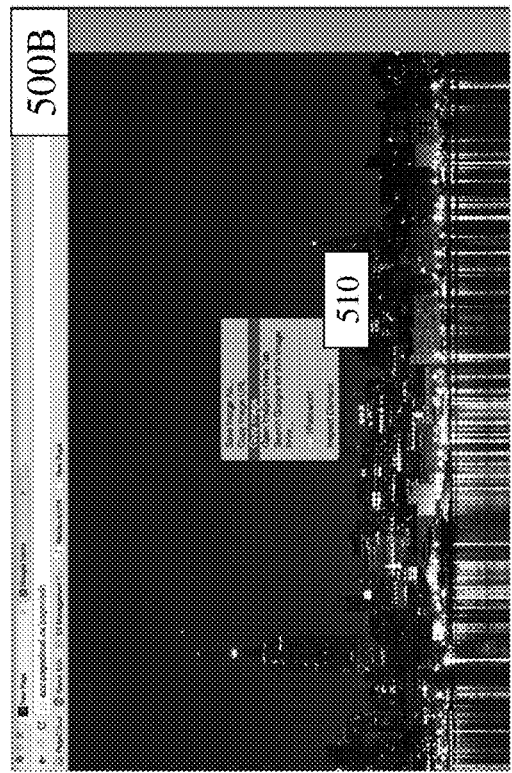

FIGS. 5A to 5F there are depicted first to sixth screenshot images 500A to 500F respectively relating to the direct insertion into a webpage of content through a paste action from another application via a WCS-WCAP according to an embodiment of the invention;

First screenshot image 500A in FIG. 5A, wherein the user has opened web content but wishes to edit the image;

Second screenshot image 500B in FIG. 5B, wherein user through a pop-up dialog 510 copies the image from the web content to a memory buffer;

Third screenshot image 500C in FIG. 5C, wherein the user opens a graphic editing software application 520 and pastes the image 530 into it;

Fourth screenshot image 500D in FIG. 5D, wherein the user within the graphic editing software application 520 modifies the image to generate modified image 540;

Fifth screenshot image 500E in FIG. 5E, wherein within the WCS-WCAP the user can replace the original image in the content with modified mage 540, which cannot be undone, or perform a standard paste with these options presented via a pop-up 550; and Sixth screenshot image 500F in FIG. 5F, wherein the modified image has been inserted into the web content and the same scaling etc. are applied to the modified image as the originally inserted image such that inserted image 560 results within the displayed webpage as opposed to modified image 540.

Accordingly, a WCS-WCAP may within the scope of embodiments of the invention support the acquisition of content within an existing item of content, its modification within one or more software applications external to the WCS-WCAP and browser, and then its re-insertion to the web content as either a standard paste operation as known in the prior art or a paste as supported according to embodiments of the invention wherein the data relating to the original image within the DOM such as scaling, displayed pixel range etc. is applied to the modified image such that the user does not need to attempt reproducing a sequence of original content insertion steps that they did not perform or did and have forgotten.

Figure 6C:
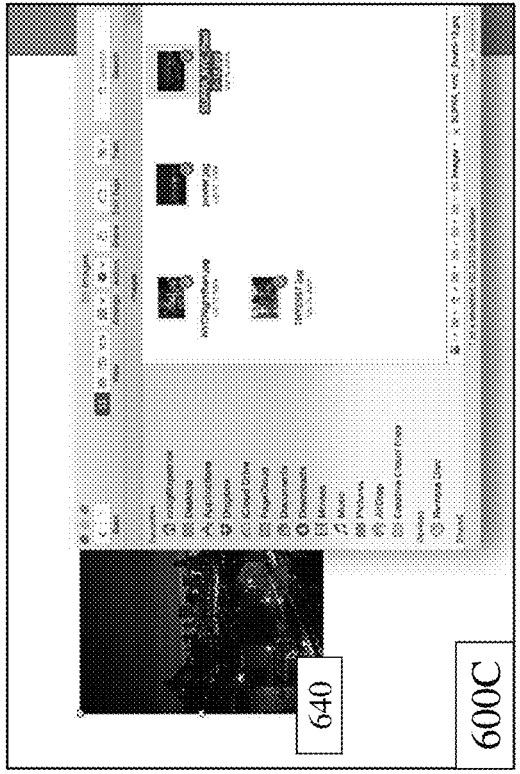
FIGS. 6A to 6D respectively depict the direct insertion into a webpage of content through a drag-and-drop action via a WCS-WCAP according to an embodiment of the invention.
Figure 6D:
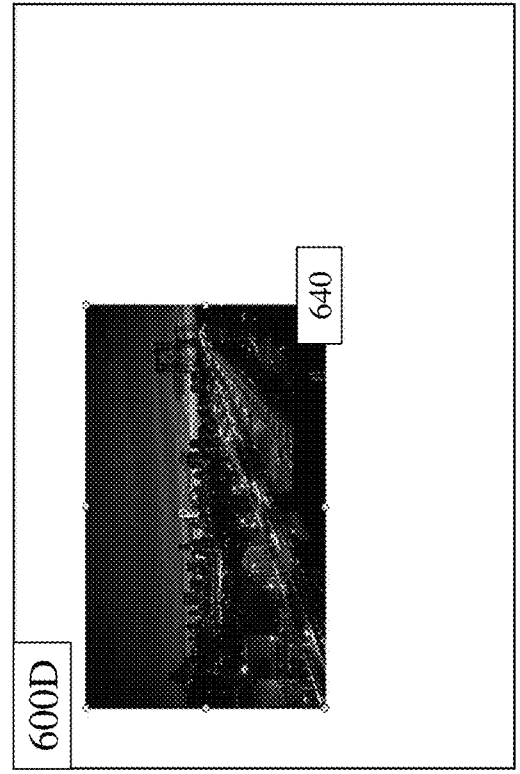
Figure 6A:
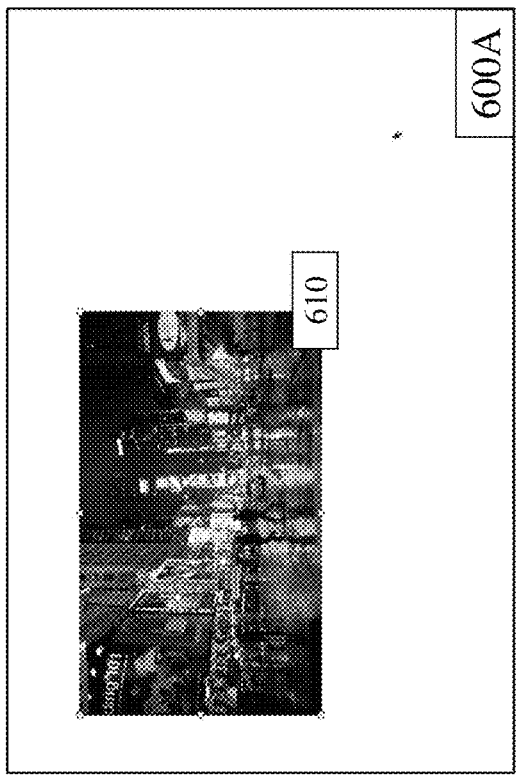
Figure 6B:
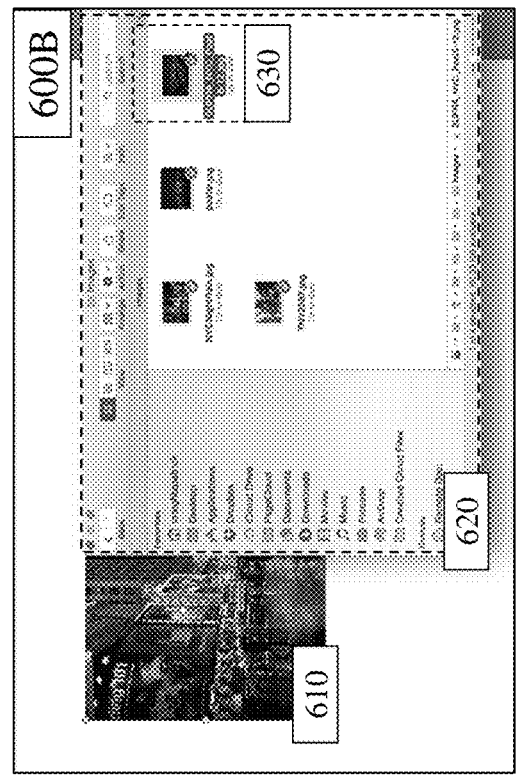

Now referring to FIGS. 6A to 6D respectively there are depicted first to fourth screenshot images 600A to 600D relating to the direct insertion into a webpage of content through a drag-and-drop action via a WCS-WCAP according to an embodiment of the invention;

First screenshot image 600A in FIG. 6A, wherein the user has opened web content comprising an image 610 whilst a WCS-WCAP is in execution;

Second screenshot image 600B in FIG. 6B, wherein the user has selected image 610 and opened a folder of images 620 including target image 630 where the folder may be upon their PED and/or FED or alternatively a remotely accessed folder, an online folder, or online retail source of images in other embodiments of the invention;

Third screenshot image 600C in FIG. 6C, wherein the user has dragged and dropped the target image 630 resulting in the WCS-WCAP replacing selected image 610 with the target image 640 but as described supra in respect of FIG. 5 the WCS-WCAP has applied the settings relating to the selected image 610 stored within its DOM automatically in inserting the target image 640; and Fourth screenshot image 600D in FIG. 6D, wherein the web content is now amended with the insertion of the target image 640.

Figure 7A:
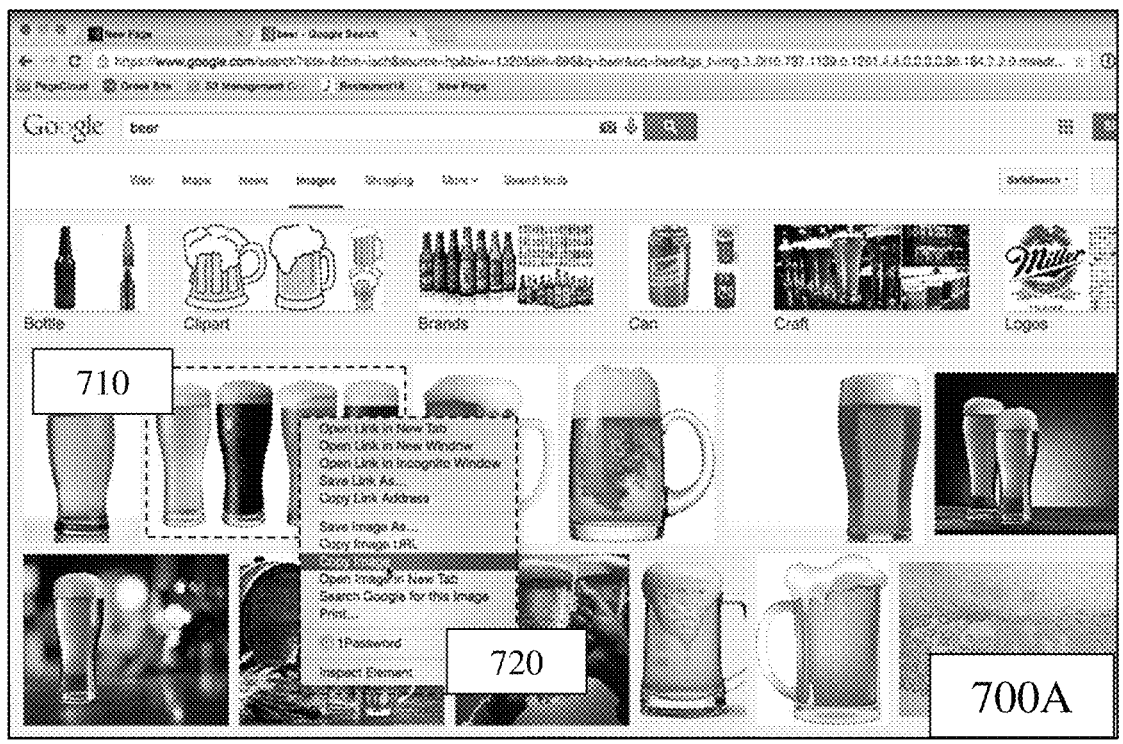
FIGS. 7A and 7B depict the direct insertion into a webpage of content through a copy-paste action from another webpage via a WCS-WCAP according to an embodiment of the invention.
Figure 7B:
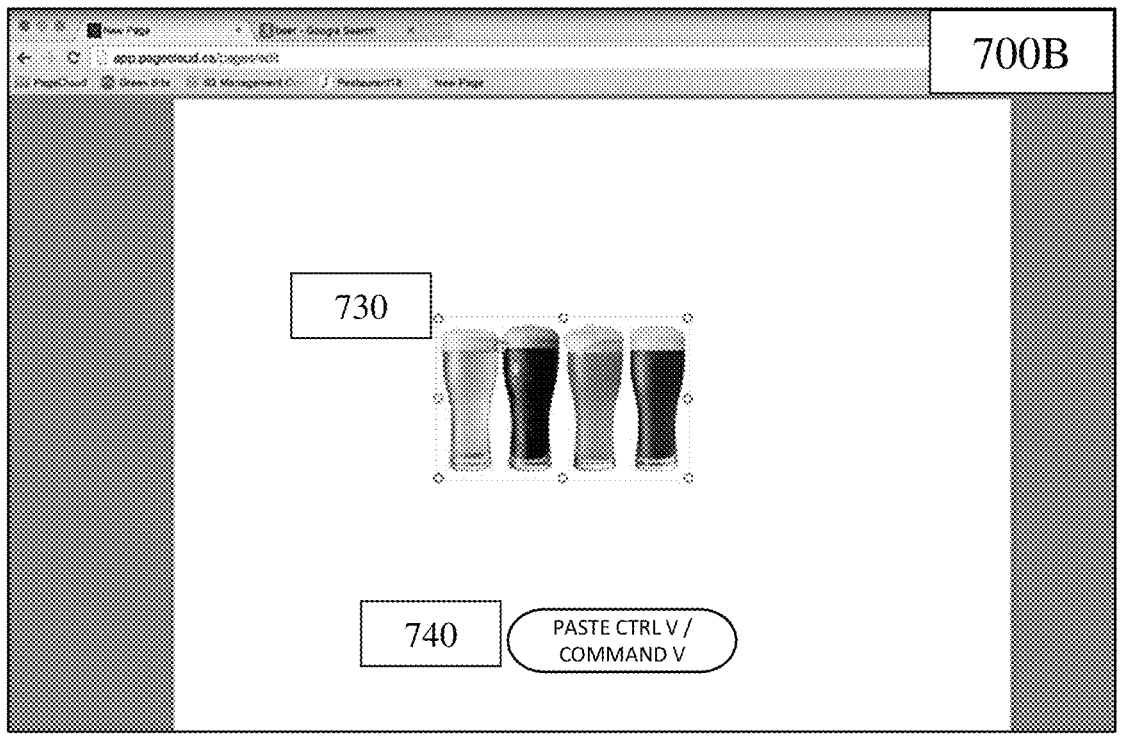

Now referring to FIGS. 7A and 7B there are depicted first and second screenshot images 700A and 700B relating to the direct insertion into a webpage of content through a copy-paste action from another webpage via a WCS-WCAP according to an embodiment of the invention. Accordingly, there are depicted:

First screenshot image 700A in FIG. 7A, wherein a user with a WCS-WCAP in execution has accessed a web page, in this instance as the result of a Google™ search for beer and selected an image 710 which through pop-up menu 720 they are copying to a memory buffer within the PED and/or FED and/or cloud storage according to their access methodology with the WCS-WCAP; and Second screenshot image 700B in FIG. 7B, depicts the user having within a web page relating to content they are working upon and via a "CTRL V" or "COMMAND V" function is pasting the acquired image 730 into the web content for immediate publishing and Internet access as they close the content they are working upon.

Optionally, when the user searches for an image or images to acquire the user may select images requiring licensing and/or purchasing. According to the configuration of the WCDS-WCAP established this may be performed automatically as a background process such that the acquisition/payment is not evident to the user or alternatively the user may be asked to provide authorisation/permission, which may include submission of one or more credentials relating to the user to authenticate the transaction. Alternatively, the user is prompted to the cost/license terms when selecting an image such that they may elect to choose to select or not select the image and/or content as whilst images are generally depicted and presented within the Figures for ease it would be evident that the content searched/acquired and merged/added may include text, graphics, music, audio content, multimedia content, audiovisual content, animated GIFs, etc.

Figure 8C:
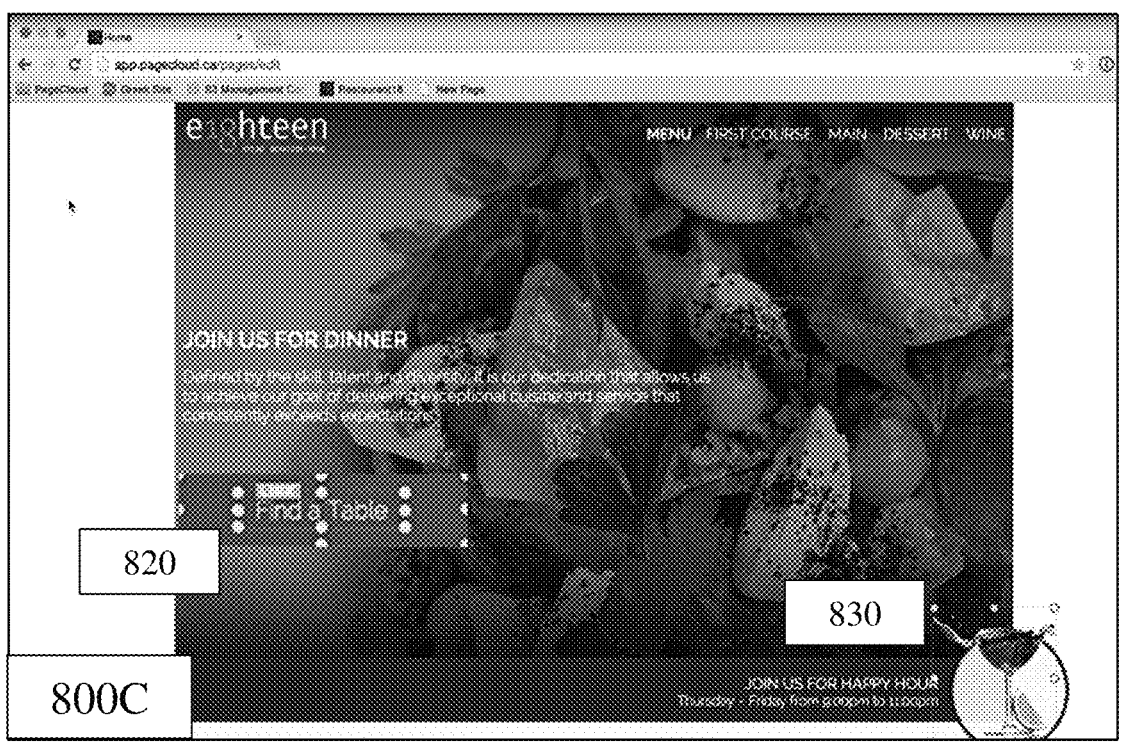

Referring to FIGS. 8A to 8C there are depicted first to third screenshot images 800A to 800C relating to the direct editing of a webpage via a WCS-WCAP menu within web browser according to an embodiment of the invention. Accordingly, these depict:

First screenshot image 800A in FIG. 8A, wherein a user within a browser has navigated to a page relating to content they have created that is currently "live" on the Internet;

Second screenshot image 800B in FIG. 8B, wherein the user has accessed a bookmarklet 810 within the browser that enables the user to launch features of a WCS-WCAP from outside an explicit application session of the WCS-WCAP, which in this instance are depicted as "New Page", "Login", "Logout", "Copy Page", "Edit Page", and "Cheat Sheet"; and Third screenshot image 800C in FIG. 8C, wherein the user has selected from the available options and is editing the web page as indicated by the markers associated with first and second content elements 820 and 830 respectively.

Figures 9A, 9B:
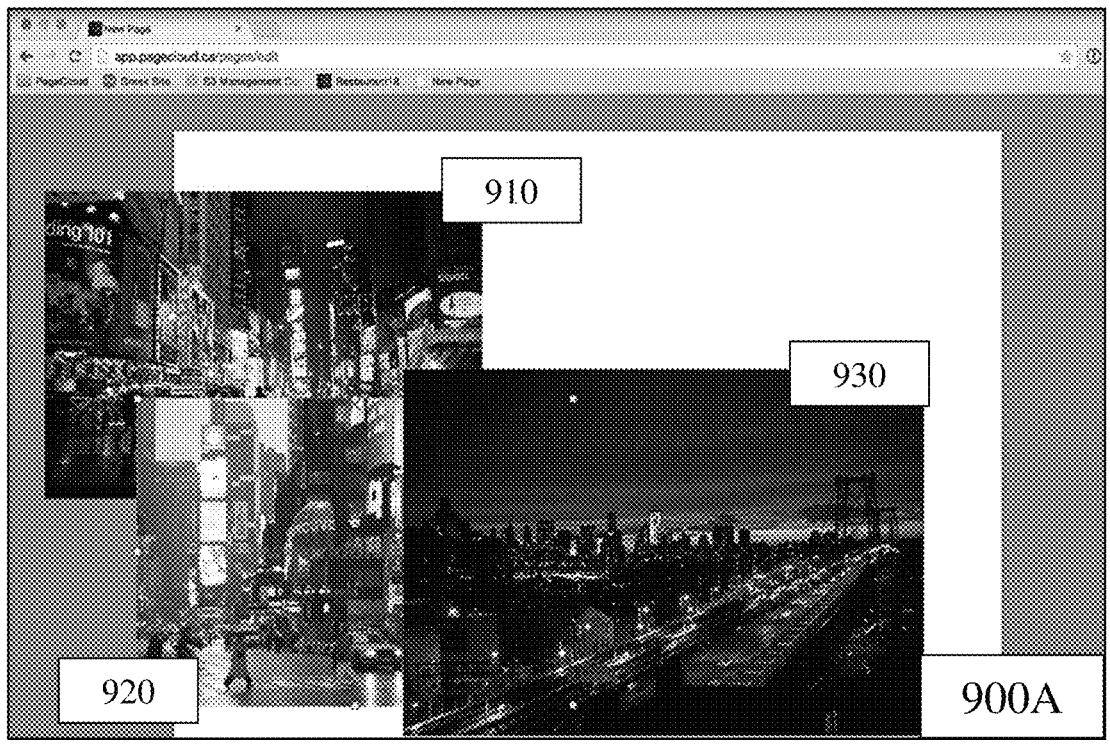
Figure 9C:
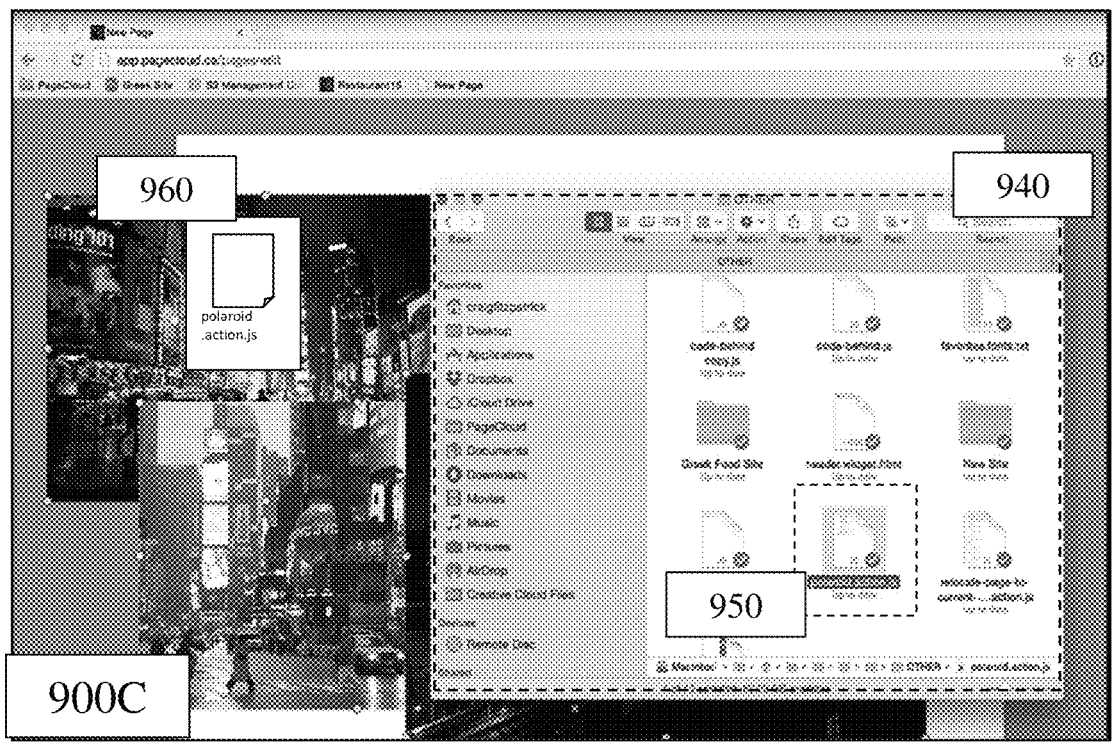
Figure 9D:
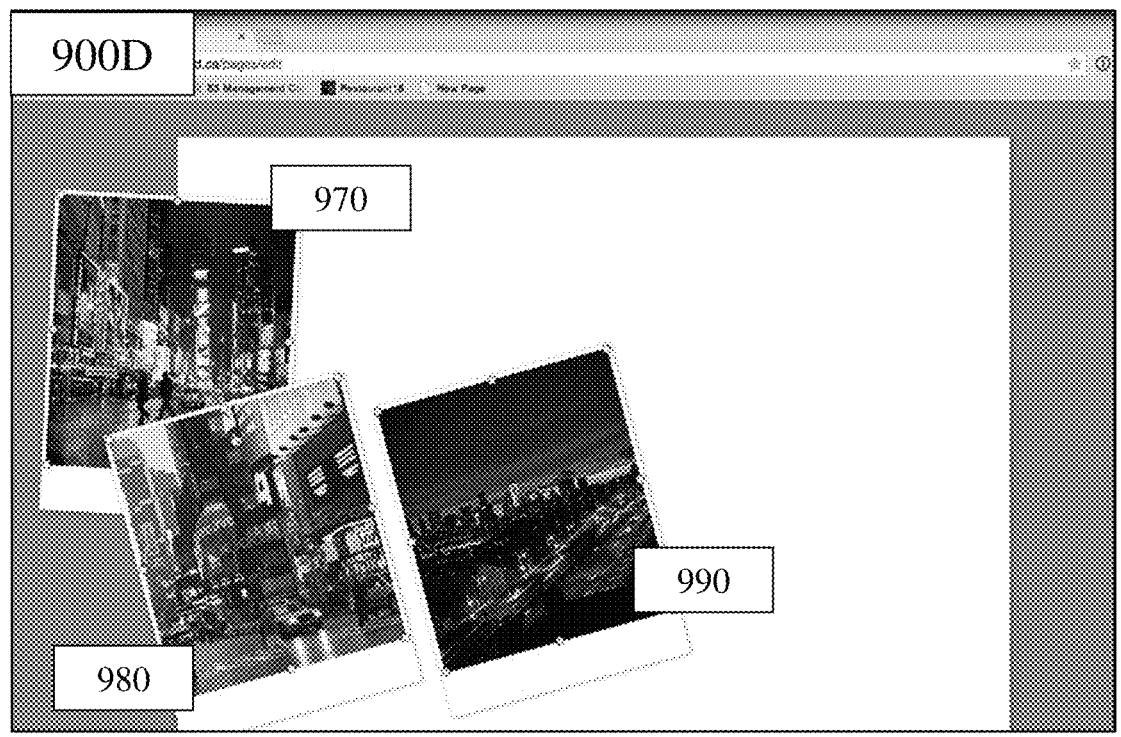

FIGS. 9A to 9E depict first to fifth screenshot images 900A to 900E relating to the automatic execution of a widget dropped on a web page with selected content via a WCS-WCAP according to an embodiment of the invention. Accordingly, there is depicted:

First screenshot image 900A in FIG. 9A, wherein a user has established a web page and added to this first to third images 910 to 930 respectively which they wish to depict within the final web page as Polaroid™ photographs;

Second screenshot image 900B in FIG. 9B, wherein the user has accessed an action 950 within a folder 940 of actions wherein action 950 is entitled "polaroid.actionjs" and executes an action to turn an image into a Polaroid™ picture by reducing the image to a predetermined aspect ratio and dimensions, adding a white border; and rotating the resulting modified image by a random value within predetermined limits;

Third screenshot image 900C in FIG. 9C, wherein the user has dragged the action 950 onto the web page as dragged action 960 with their first to third images 910 to 930 respectively;

Fourth screenshot image 900D in FIG. 9D, wherein the action 950 has executed on each of the first to third images 910 to 930 yield first to third Polaroids 970 to 990 respectively; and Fifth screenshot image 900E in FIG. 9E, wherein the user has opened action 950 entitled "polaroid.action.js" wherein it can be seen within the script that first and second processing blocks 950A and 950B act upon all selected images, wherein with first processing block 950A the images are reduced to a predetermined width and height (e.g. 270 pixels wide and 300 pixels high) to which a 5 pixel wide white border is added on 3 sides and a 50 pixel border added at the bottom and then the second processing block 950B takes the resulting image and rotates based upon returned values from a pseudorandom number generator.

Within third screenshot image 900C in FIG. 9C the dragged action 960 is depicted as a large white box with content. Optionally, the dragged action 960 may be simply a semi-transparent rendering of action 950 or an alternate means of display as known in the prior art.

Figure 10C:
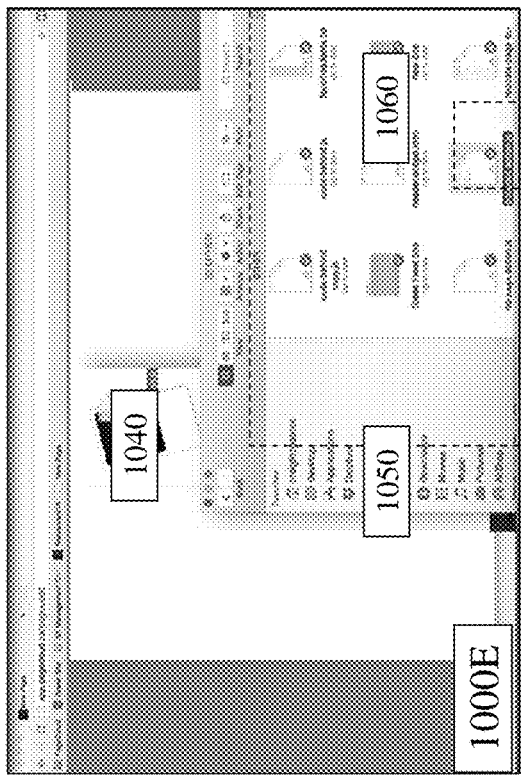
Figure 10E:
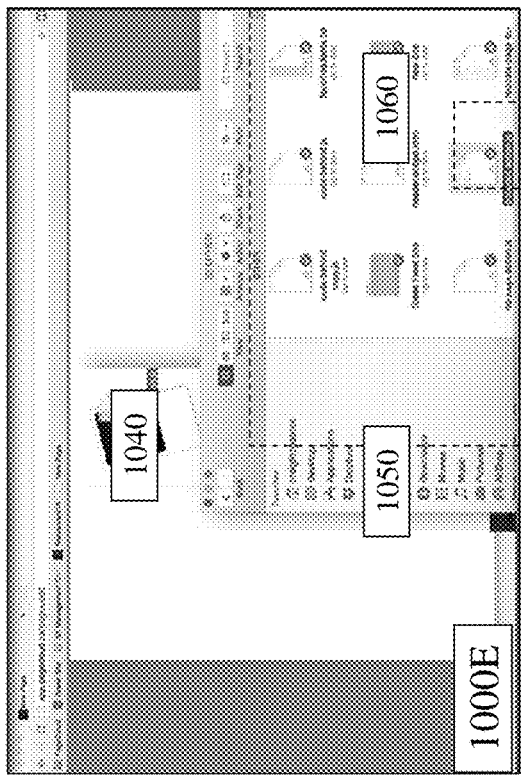
Figure 10D:
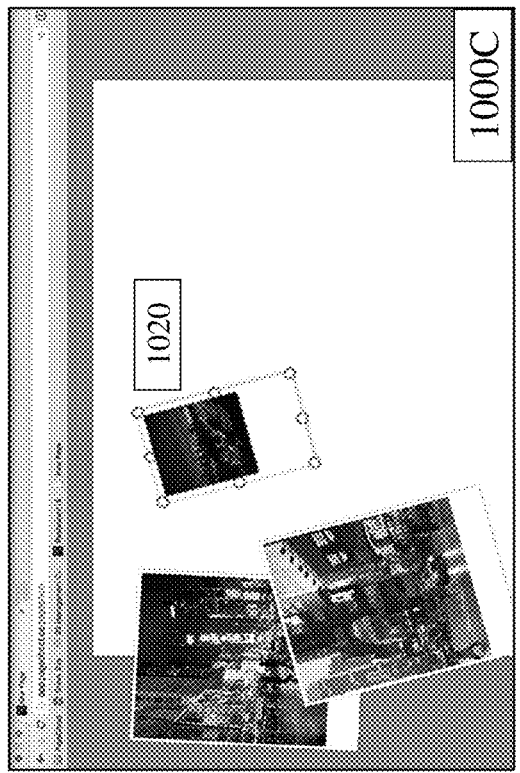
Figure 10F:
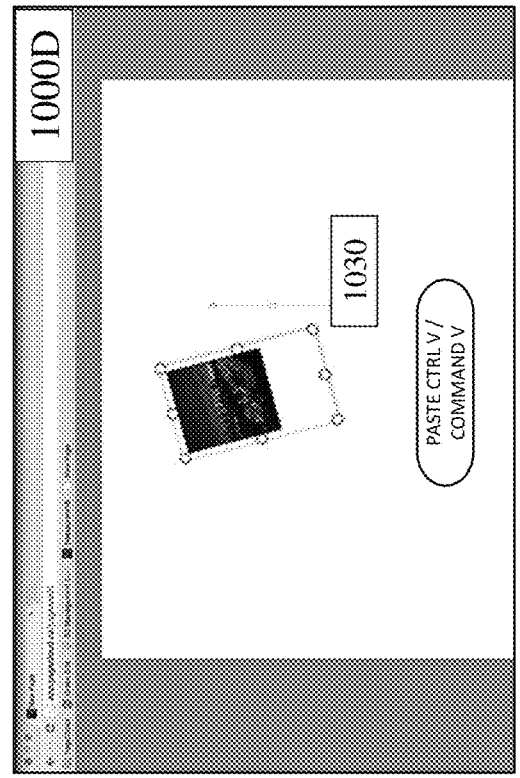

Referring to FIGS. 10A to 10F respectively there are depicted first to sixth screenshot images 1000A to 1000E relating to the generation of a widget relating to image manipulation within a web page via a WCS-WCAP according to an embodiment of the invention. Accordingly, there is depicted:

First screenshot image 1000A in FIG. 10A, wherein the user has accessed the content established in fourth screenshot image 900D in FIG. 9D, namely a webpage with first to third Polaroids 970 to 990 respectively;

Second screenshot image 1000B in FIG. 10B, wherein the user has selected an image, in this instance third Polaroid 990 and reduced it to a thumbnail image 1010 within the content they are working with;

Third screenshot image 1000C in FIG. 10C, wherein the user has selected the thumbnail image 1010 as selected image 1020 and then within fourth screenshot image 1000D in FIG. 10D has pasted the selected image to a new web page as pasted image 1030;

Fifth screenshot image 1000E in FIG. 10E, wherein the user has associated an action, "polaroid.action.js" 1060, selected from a set of available actions 1050 with the pasted image 1030 to generate action icon 1040; and Sixth screenshot image 1000F in FIG. 10F, wherein the finished action icon 1070.

Figure 11A:
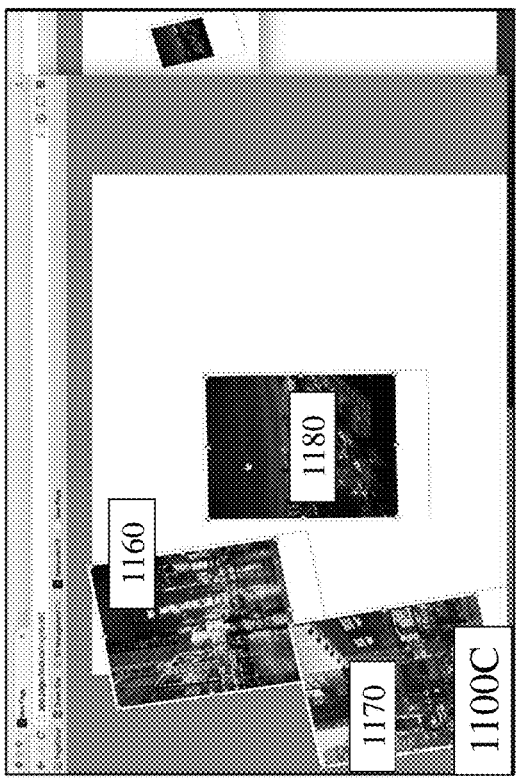
FIGS. 11A to 11C respectively the use of a web page based widget as generated according to a process such as depicted in FIGS. 10A and 10B via a WCS-WCAP according to an embodiment of the invention.
Figure 11B:
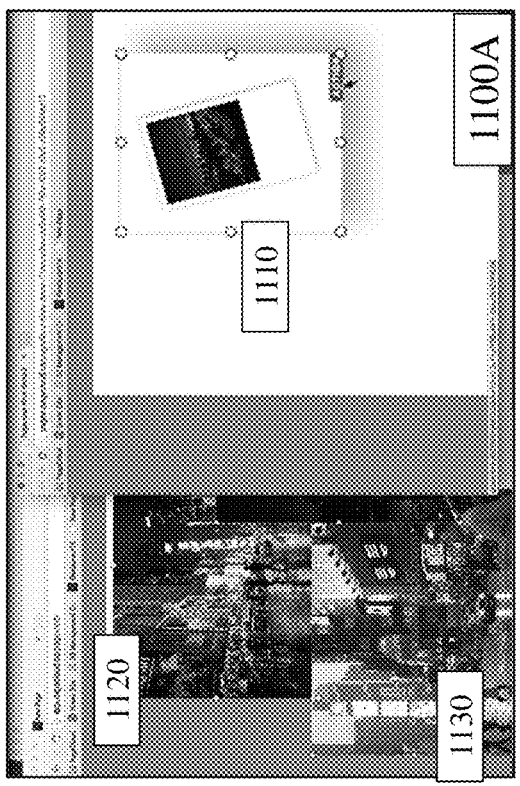
Figure 11C:
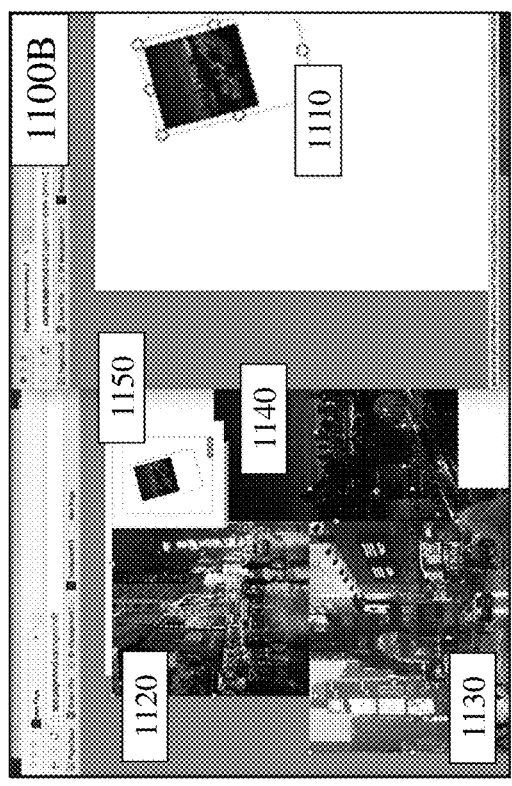

Accordingly, final action icon 1070 behaves the same as action 1050 in respect of the content it acquires and the processing applied. However, now such action icons may be part of a WCS-WCAP, action repository, online action store, etc. as well as part of an item of web content distributed, licensed, and/or acquired with an image, for example, providing the user with a visual indication of the action's function. However, as evident in FIGS. 11A and 11C where there are depicted first to third screenshot images 1100A to 1100C relating to the use of a web page based action as generated according to a process such as depicted in FIGS. 10A to 10F respectively via a WCS-WCAP according to an embodiment of the invention. Accordingly, there is depicted:

First screenshot image 1100A in FIG. 11A, wherein the user has opened web content within which is action icon 1110 together with first and second content image 1120 and 1130 respectively (a third content image is overlaid by the opened web content with the action icon 1110;

Second screenshot image 1100B in FIG. 11B, wherein the user has dragged the action 1150 onto the other content page comprising the first to third content images 1120 to 1140 respectively; and Third screenshot image 1100C in FIG. 11C, wherein the dragged action 1150 has now acted upon the first to third content images 1120 to 1140 respectively to generate first to third Polaroid images 1160 to 1180.

Within second screenshot image 1100B in FIG. 11B the dragged action 1150 is depicted as a large white box with content for clarity in the Figures. Optionally, the dragged action 1150 may be simply a semi-transparent rendering of action 950 or an alternate means of display as known in the prior art. Irrespective of these aspect the action icon 1150 executes an action when dragged and dropped onto the appropriate content form. Alternatively, the action icon, such as action icon 1150, may have content dragged onto it rather that it being dragged itself.

Figure 12A:
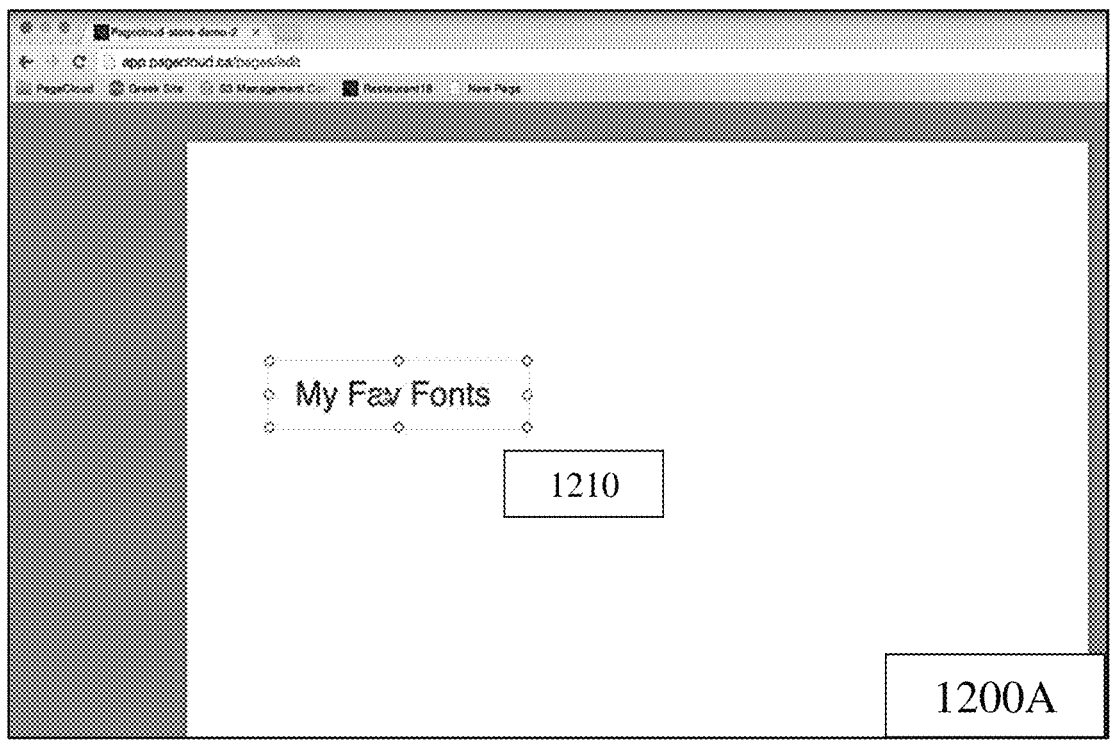
Figure 12B:
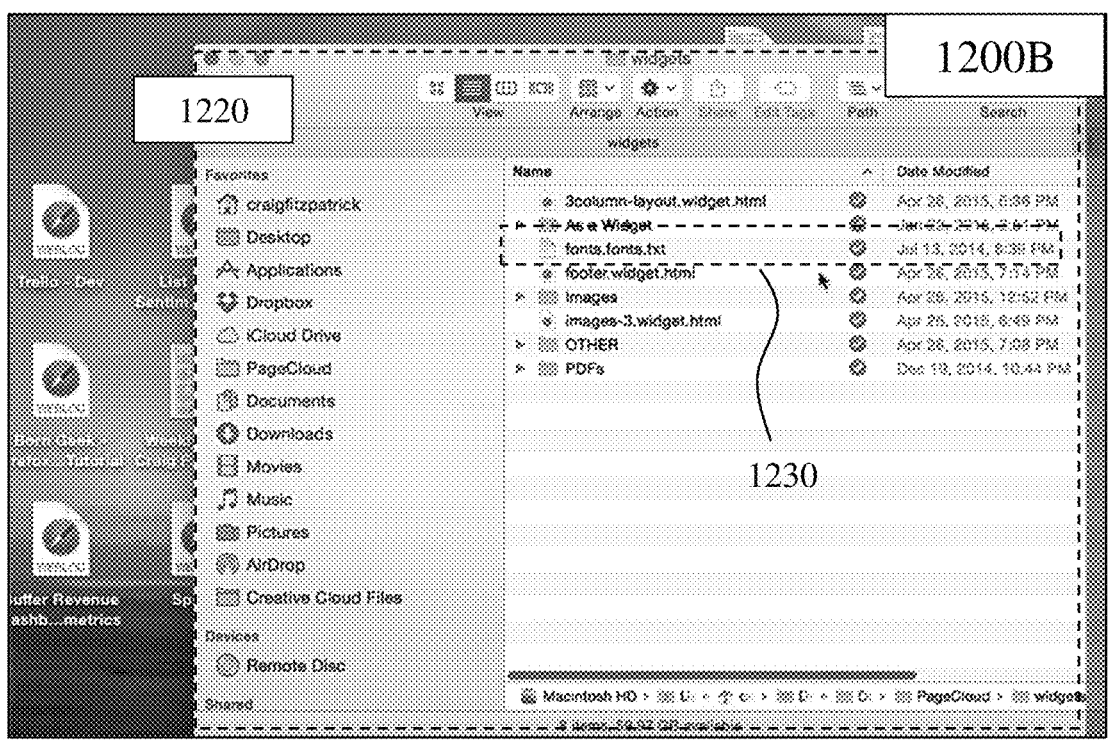
Figure 12G:
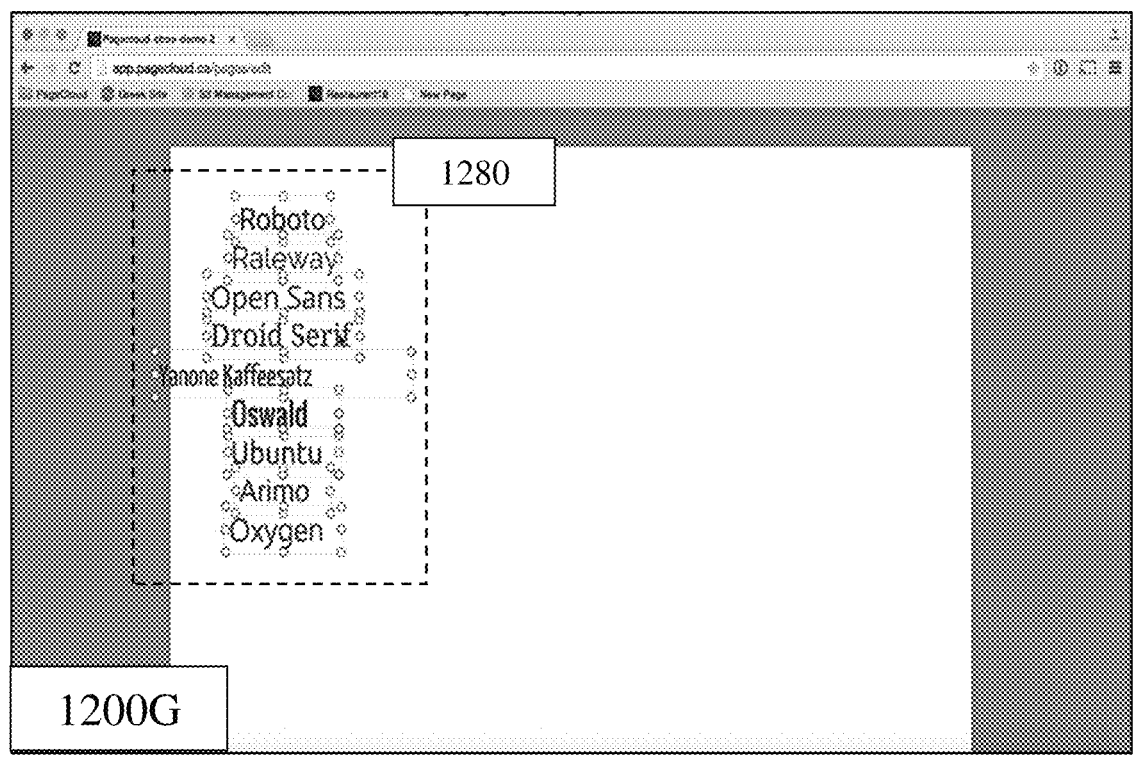

Referring to FIGS. 12A through 12G respectively there are depicted first to seventh screenshot images 1200A to 1200G relating depict the generation and application of a widget relating to font loading and use via a WCS-WCAP according to an embodiment of the invention. Accordingly, there is depicted:

First screenshot image 1200A in FIG. 12A, wherein the user creates an initial text box 1210 which they wish to have associated with the action to be generated although as evident from FIG. 11 above and within this specification the element rather than a text box 1210 may be an image, audiovisual content, etc.;

Second screenshot image 1200B in FIG. 12B, wherein the user has opened an action folder 1220 within which is the action 1230, "fonts.fonts.txt" the user wishes to create the element for;

Third screenshot image 1200C in FIG. 12C, wherein the user has opened the action 1230 and is presented with a pop-up 1240 listing the fonts as URLs, e.g. "http://www.google.com/fonts/specimen/OpenSans";

Fourth screenshot image 1200D in FIG. 12D, wherein the user has associated the action to the text box 1210 creating action box 1250, this may for example be via selecting the text box 1210 and dragging the action 1230 from action folder 1220 over it;

Fifth screenshot image 1200E in FIG. 12E, wherein the user is dragging the action box 1250 from the current active web page to a different web page;

Sixth screenshot image 1200F in FIG. 12F, wherein when dropped onto the web page the action box executes, which in this case is the installation of the fonts within the action 1230, "fonts.fonts.txt"; and Seventh screenshot image 1200G in FIG. 12G, wherein the user has now moved the web page and can see all 9 fonts installed via the action 1230, "fonts.fonts.txt", embedded within the action box 1250, namely "Roboto", "Raleway", "Open Sans", "Droid Serif", "Yanone Kaffesatz", "Oswald", "Unbuntu, "Arimo", and "Oxygen".

Figure 13A:
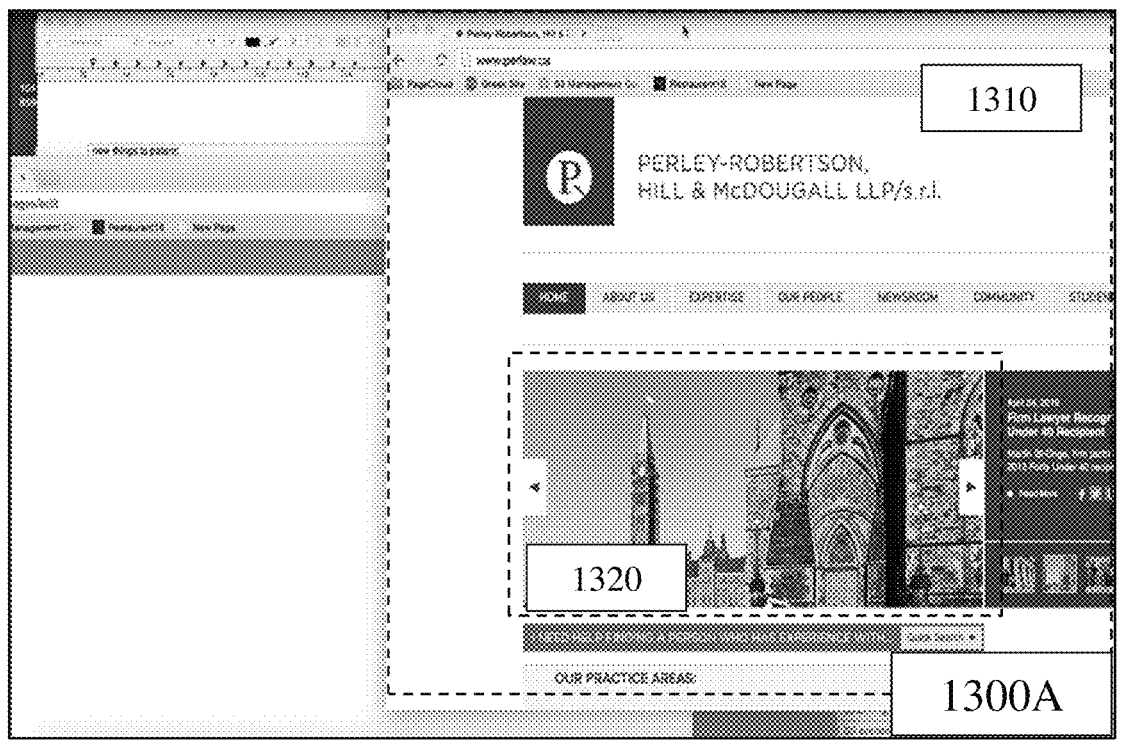
FIGS. 13A and 13B respectively depict the direct copying and embedding of an image from one web page to another via a WCS-WCAP according to an embodiment of the invention.
Figure 13B:
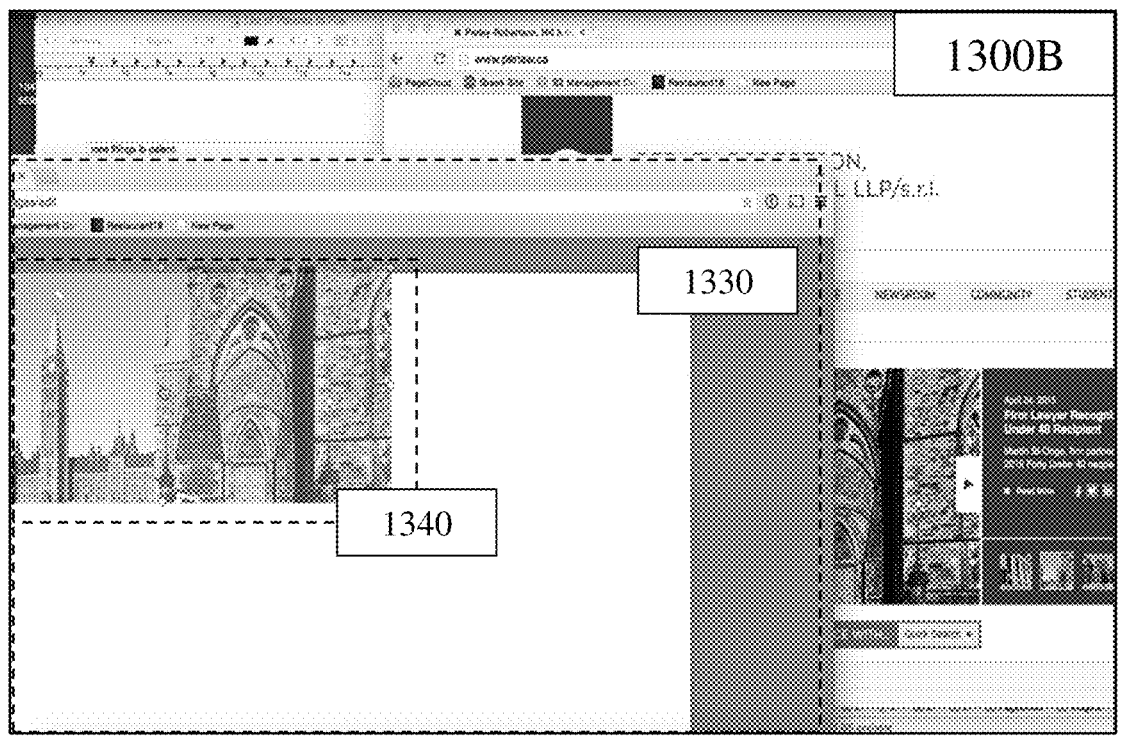

Referring to FIGS. 13A and 13B there are depicted first and second screenshot images 1300A and 1300B relating to the direct copying and embedding of an image from one web page to another via a WCS-WCAP according to an embodiment of the invention. Accordingly, there is depicted:

First screenshot image 1300A in FIG. 13A, wherein the user has navigated to a first webpage 1310 within which is content 1320 that the user wishes to access in a similar manner to that described supra; and Second screenshot image 1300B in FIG. 13B, wherein the user has simply selected the content 1320 and copied it to a new page 1330 and it is now embedded as new image 1340.

Figures 14A, 14B:
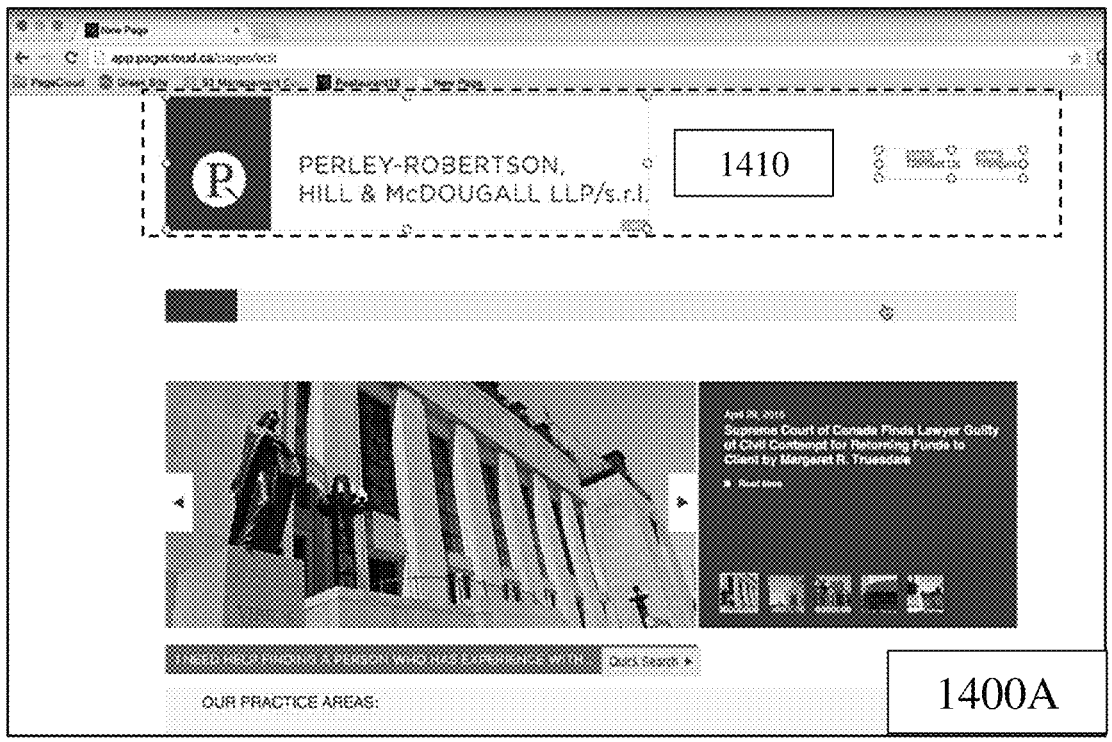
FIGS. 14A to 14E respectively depict the copying of content from a web page, its embedding to a widget, and the use of the widget via a WCS-WCAP according to an embodiment of the invention.
Figure 14C:
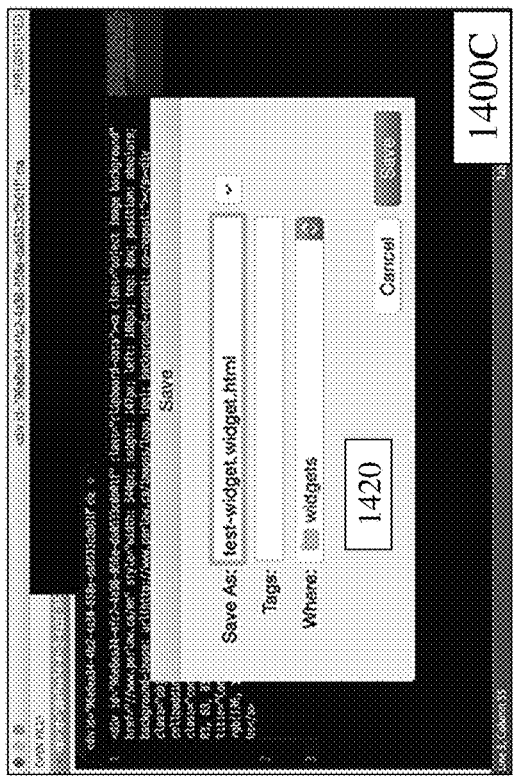

Now referring to FIGS. 14A to 14E respectively there are depicted first to fifth screenshot images 1400A and 1400B relating to copying of content from a web page, its embedding to a widget, and the use of the widget via a WCS-WCAP according to an embodiment of the invention. Accordingly, there is depicted:

First screenshot image 1400A in FIG. 14A, wherein the user has navigated to a web page within a WCS-WCAP according to an embodiment of the invention and selected multiple items of content 1410;

Second screenshot image 1400B in FIG. 14B, wherein the user has generated a text document through a copy and paste application within the WCS-WCAP environment wherein the DOM of the selected multiple items of content 1410 is pasted into the text document;

Third screenshot image 1400C in FIG. 14C, wherein the user now through a save process 1420 associates the pasted DOM content for the selected multiple items of content 1410 to a widget, "test-widget.widgets.html."

Figure 14E:
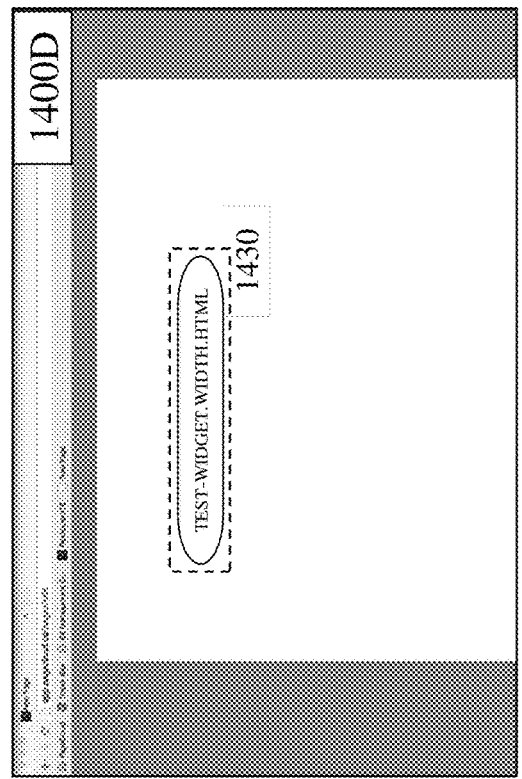
Figure 14D:
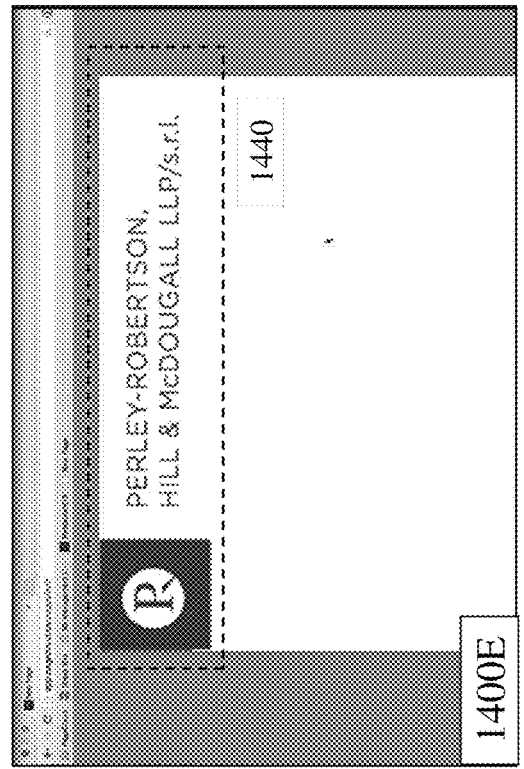

Fourth screenshot image 1400D in FIG. 14D, wherein the user has inserted the widget onto a new web page, inserted widget 1430; and Fifth screenshot image 1400E in FIG. 14E, wherein the inserted widget 1430 in fourth screenshot image 1400D has now executed within the WCS-WCAP environment such that the selected multiple items of content 1410 are now inserted as new content 1440 to the other web page.

Figure 15A:
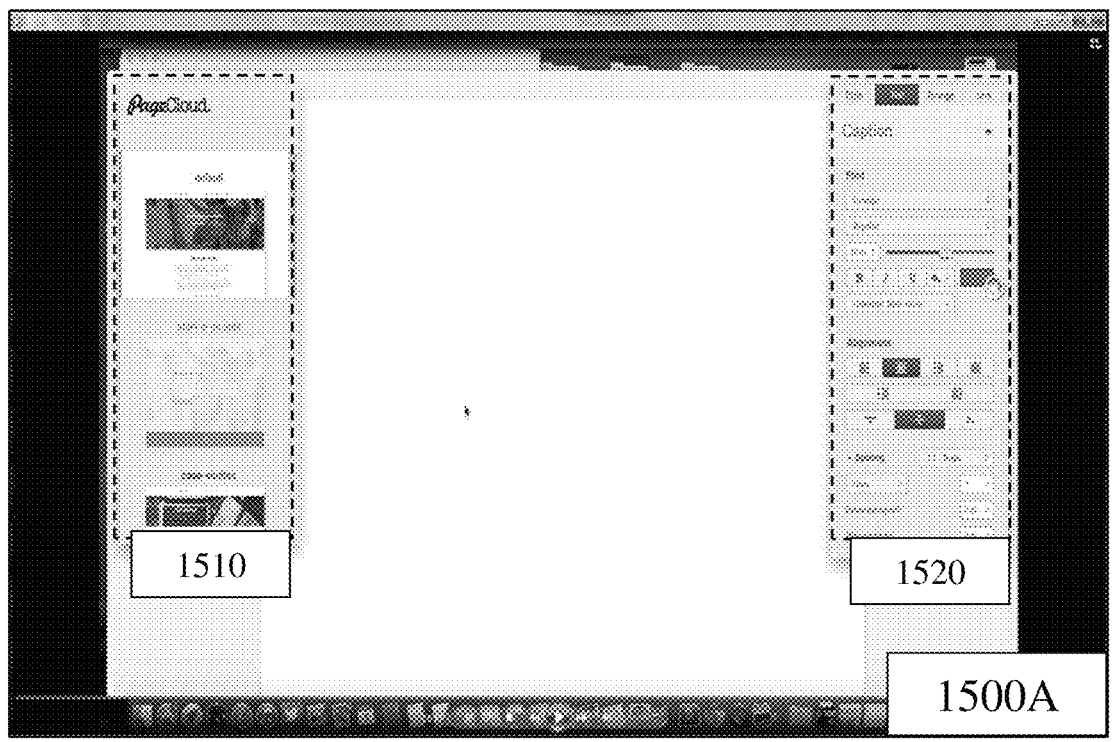
Figure 15B:
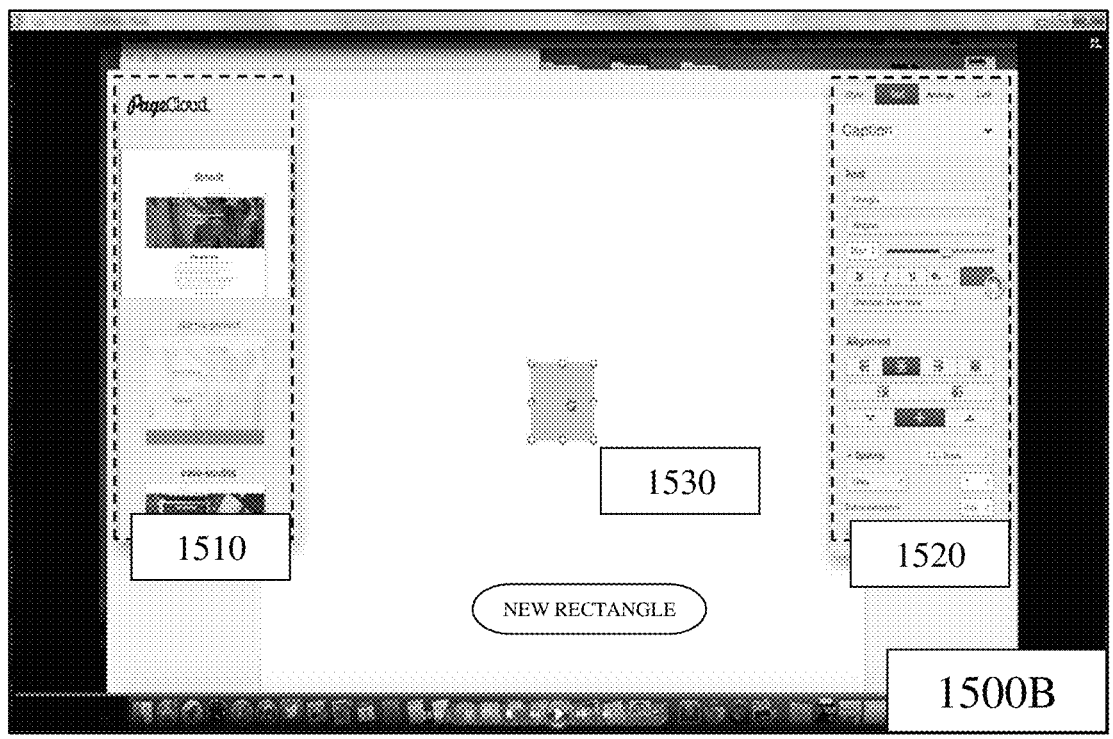

Now referring to FIGS. 1A to 15D respectively there are depicted first to fourth screenshot images 1500A to 1500D relating to intelligent palettes within a WCS-WCAP according to an embodiment of the invention. Accordingly, as depicted:

First screenshot image 1500A in FIG. 15A, wherein a user within a WCS-WCAP environment is about to work upon a new web page or web content and has displayed first and second palettes 1510 and 1520 providing access to tools, features, settings, etc. according to the configuration of the first and second palettes 1510 and 1520 either by default or as established by the user;

Second screenshot image 1500B in FIG. 15B, wherein the user has added a new rectangle 1530 to the web page and first and second palettes 1510 and 1520 maintain their position and visibility;

Third screenshot image 1500C in FIG. 15C, wherein as the user moves the rectangle 1530 the first and second palettes 1510 and 1520 become transparent as evident from empty display regions 1540 and 1550 respectively allowing the user to work in an uncluttered environment from the palettes the WCS-WCAP displays and/or the user has selected to display; and Fourth screenshot image 1500D in FIG. 15D, wherein the user has released the rectangle 1530 into new location 1560 and now the user is re-presented with the palettes but as third and fourth palettes 1570 and 1580 as the pair of palettes new locations are determined based upon the content of the web page so that they do not conflict with the web page content.

Accordingly, as depicted third palette 1570 and first palette 1510 have similar positions relative to the content of the web page although the third palette 1570 is now partially displayed as the web page has been moved laterally within the displayed window.

Figures 16A, 16B:
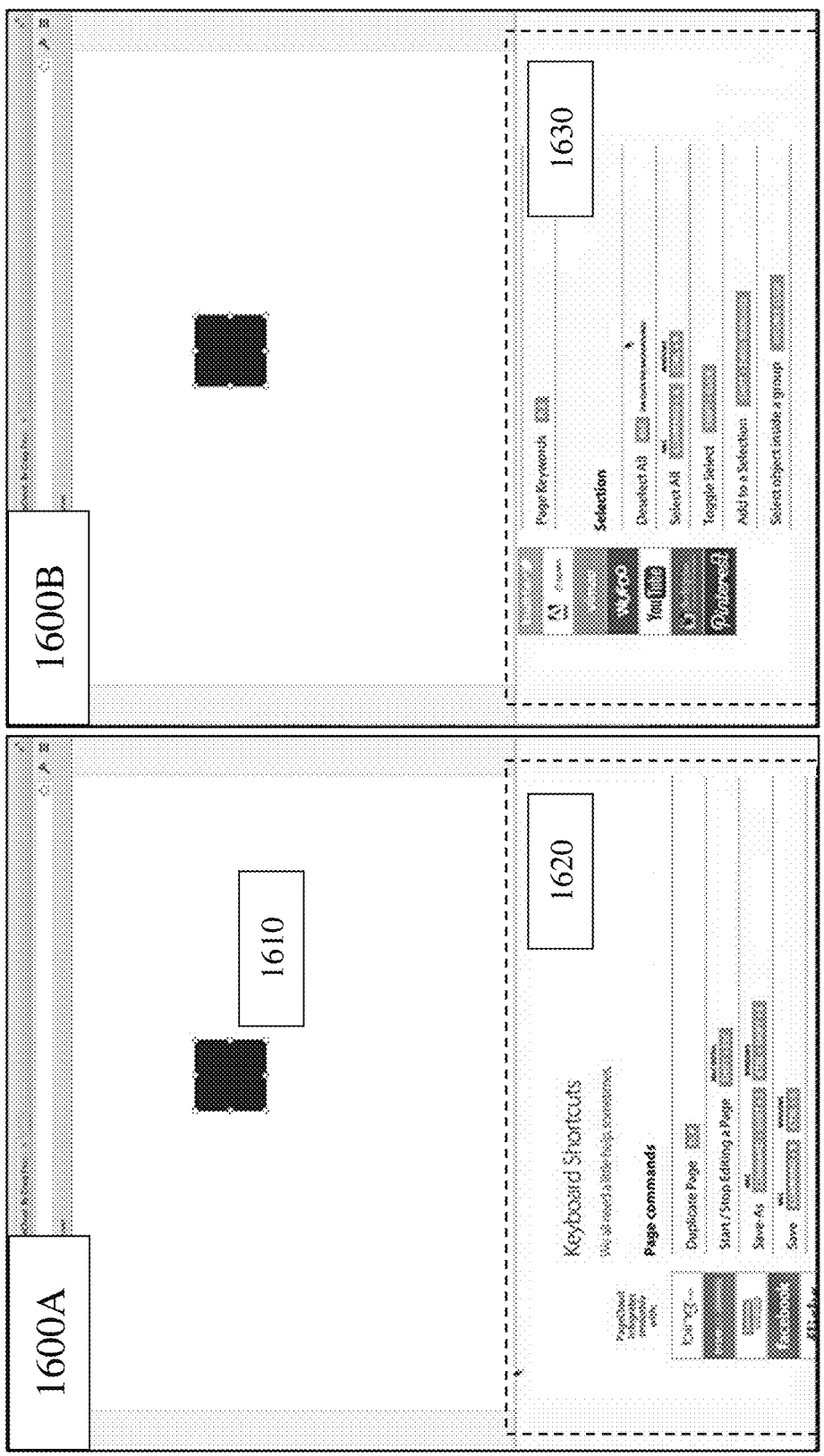
FIGS. 16A to 16D respectively depict the exploitation of Iframe with web pages via a WCS-WCAP according to an embodiment of the invention to provide editable regions and/or segmented content.
Figure 16C:
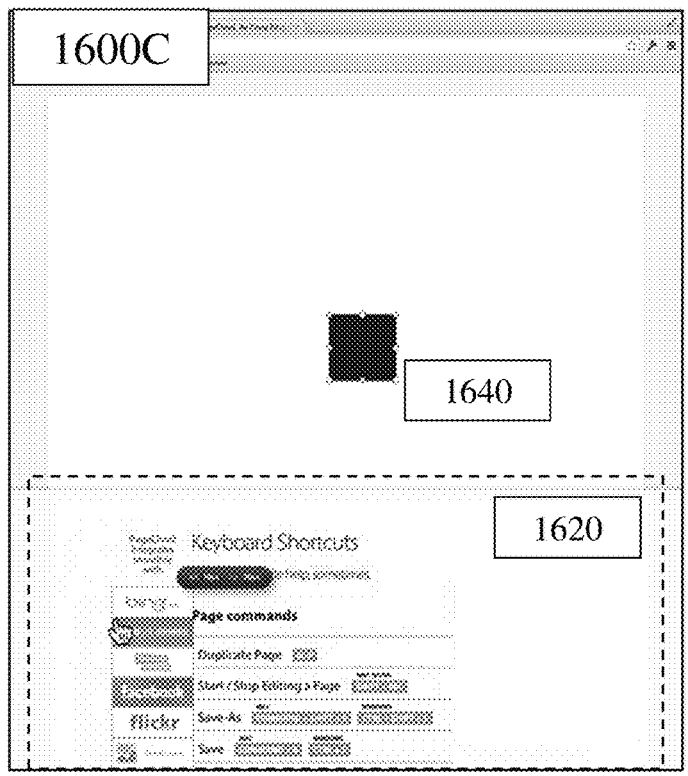
Figure 16D:
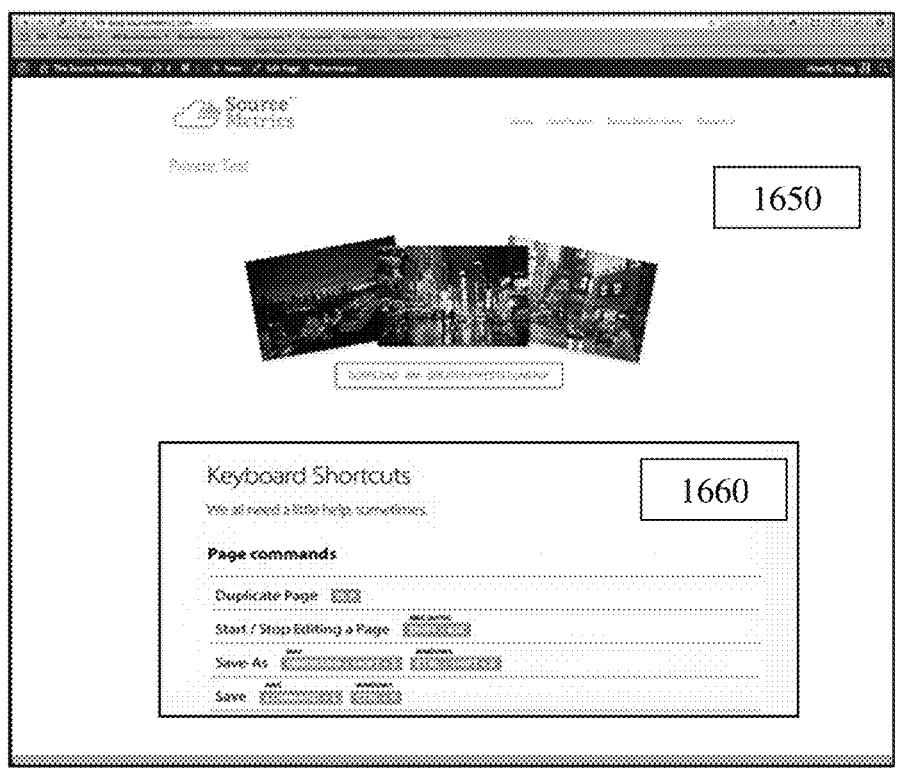

Referring to FIGS. 16A to 16D there are depicted first to fourth screenshot images 1600A to 1600D relating to the exploitation of an HTML Inline Frame Element (<iframe> or iframe) with a web page via a WCS-WCAP according to an embodiment of the invention to provide editable regions and/or segmented content. An iframe or iframes allow a visual HTML browser window to be split into segments, each of which can show a different document. This can lower bandwidth use in many instances such as portable applications, as repeating parts of a layout can be used in one frame, while variable content is displayed in another. Accordingly, as depicted:

First screenshot image 1600A in FIG. 16A, wherein the user has open an active content page with an item of content 1610 being edited wherein at the bottom of the page is an iframe with first content 1620 providing the user with a series of keyboard shortcuts;

Second screenshot image 1600B in FIG. 16B, wherein the user has scrolled within the iframe resulting in second content 1630 being displayed but no modification or adjustment of the active content page and item of content 1610 occurs;

Third screenshot image 1600C in FIG. 16C, wherein the user can move the item of content 1610 into a new position 1640 without affecting the first content 1620 displayed within the iframe but importantly within embodiments of the invention the user can edit the content within the iframe within the browser window where in this instance they have selected the left application listing (and will delete it); and Fourth screenshot image 1600D in FIG. 16D, wherein the modified iframe 1660 is now displayed within a new web page 1650 with the left application listing deleted relative to the first content 1610 in first screenshot image 1600A.

Accordingly, a user may access previously generated content, embed it within new content as an iframe and whilst editing/modifying the new content may also edit the content within iframe directly without requiring them to work in multiple separate windows or exit the new content in order to work on the content within the iframe and then reload everything. It would be evident that optionally this nested content hierarchy may be edited down within the same current active window or that according to user access privileges, WCS-WCAP feature set etc. the user's ability to edit the iframe or down through a hierarchy is limited or blocked, for example.

Within the preceding description in respect of embodiments of the invention and FIGS. 1A to 16D in several instances a user is presented as triggering the execution of actions (running actions) on the page. However, the embodiments of the invention are not limited to interacting with selected objects and may execute directly with or without associated selected objects. Accordingly, an action may work on all text, all images, etc.

Figure 17:
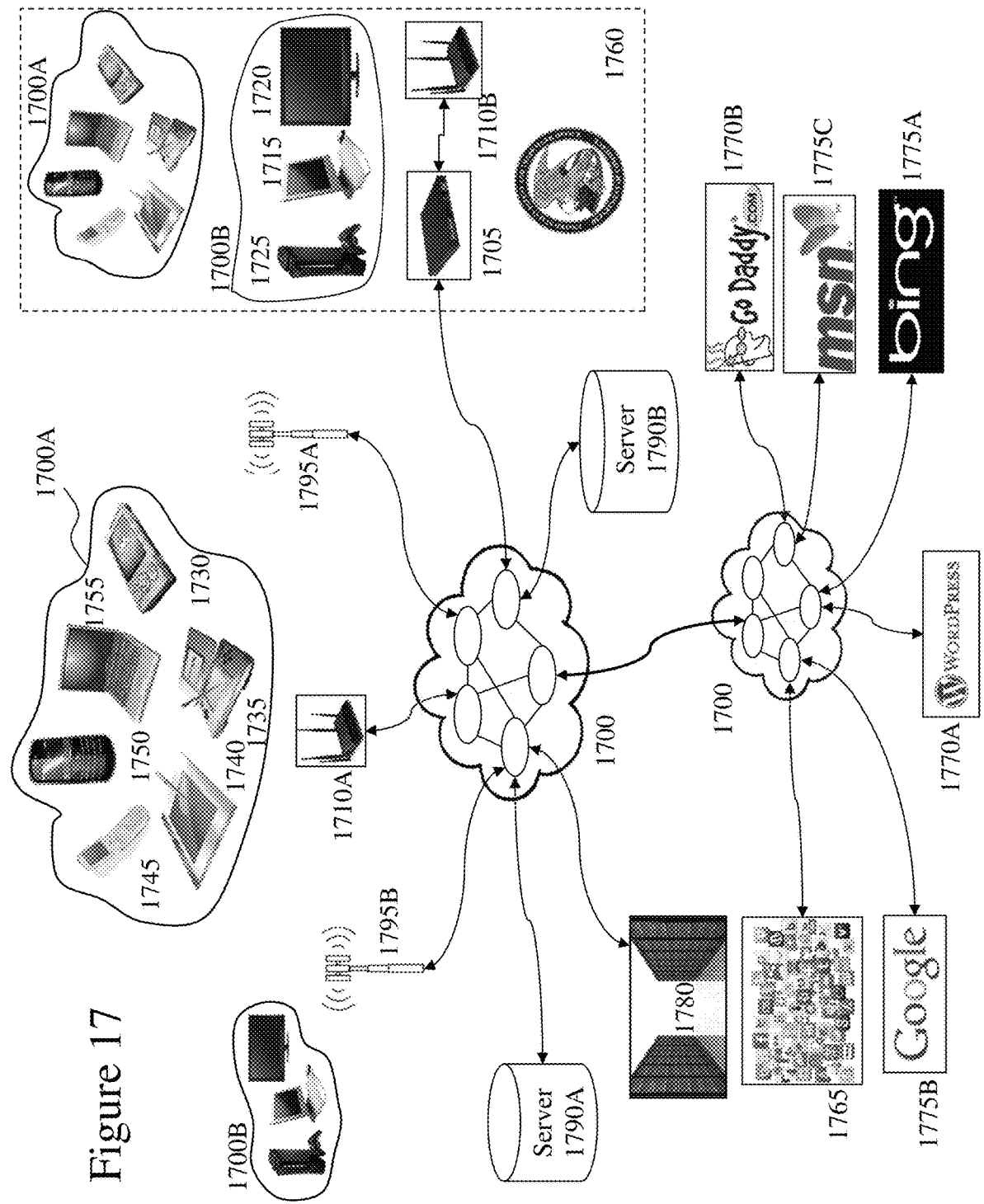
FIG. 17 depicts a network environment within which embodiments of the invention may be employed.

Referring to FIG. 17 there is depicted a network environment 1700 within which embodiments of the invention may be employed supporting web content systems and web content applications/platforms (WCS-WCAPs) according to embodiments of the invention. Such WCS-WCAPs, for example supporting multiple channels and dynamic content. As shown first and second user groups 1700A and 1700B respectively interface to a telecommunications network 1700. Within the representative telecommunication architecture, a remote central exchange 1780 communicates with the remainder of a telecommunication service providers network via the network 1700 which may include for example long-haul OC-48/OC-192 backbone elements, an OC-48 wide area network (WAN), a Passive Optical Network, and a Wireless Link. The central exchange 1780 is connected via the network 1700 to local, regional, and international exchanges (not shown for clarity) and therein through network 1700 to first and second cellular APs 1795A and 1795B respectively which provide Wi-Fi cells for first and second user groups 1700A and 1700B respectively. Also connected to the network 1700 are first and second Wi-Fi nodes 1710A and 1710B, the latter of which being coupled to network 1700 via router 1705. Second Wi-Fi node 1710B is associated with Enterprise 1760, e.g.

United States Patent & Trademark Office (USPTO), within which other first and second user groups 1700A and 1700B are present. Second user group 1700B may also be connected to the network 1700 via wired interfaces including, but not limited to, DSL, Dial-Up, DOCSIS, Ethernet, G.hn, ISDN, MoCA, PON, and Power line communication (PLC) which may or may not be routed through a router such as router 1705.

Within the cell associated with first AP 1710A the first group of users 1700A may employ a variety of PEDs including for example, laptop computer 1755, portable gaming console 1735, tablet computer 1740, smartphone 1750, cellular telephone 1745 as well as portable multimedia player 1730. Within the cell associated with second AP 1710B are the second group of users 1700B which may employ a variety of FEDs including for example gaming console 1725, personal computer 1715 and wireless/Internet enabled television 1720 as well as cable modem 1705. First and second cellular APs 1795A and 1795B respectively provide, for example, cellular GSM (Global System for Mobile Communications) telephony services as well as 3G and 4G evolved services with enhanced data transport support. Second cellular AP 1795B provides coverage in the exemplary embodiment to first and second user groups 1700A and 1700B. Alternatively the first and second user groups 1700A and 1700B may be geographically disparate and access the network 1700 through multiple APs, not shown for clarity, distributed geographically by the network operator or operators. First cellular AP 1795A as show provides coverage to first user group 1700A and environment 1770, which comprises second user group 1700B as well as first user group 1700A. Accordingly, the first and second user groups 1700A and 1700B may according to their particular communications interfaces communicate to the network 1700 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 1700A may form associations either through standards such as IEEE 802.15 and Bluetooth as well in an ad-hoc manner.

Also connected to the network 1700 are Social Networks (SOCNETS) 1765, first and second service providers 1770A and 1770B respectively, e.g. WordPress™ and GoDaddy™, and first to third party providers 1775A to 1775C respectively, e.g. Bing™, Google™, and MSN™ as well as first and second servers 1790A and 1790B which together with others, not shown for clarity. First and second servers 1790A and 1790B may host according to embodiments of the inventions multiple services associated with a web content systems and web content applications/platforms (WCS-WCAPs); a provider of a SOCNET or Social Media (SOME) exploiting WCS-WCAP features; a provider of a SOCNET and/or SOME not exploiting WCS-WCAP features; a provider of services to PEDS and/or FEDS; a provider of one or more aspects of wired and/or wireless communications; an Enterprise 1760 exploiting WCS-WCAP features; license databases; content databases; image databases; content libraries; customer databases; websites; and software applications for download to or access by FEDs and/or PEDs exploiting and/or hosting WCS-WCAP features. First and second primary content servers 1790A and 1790B may also host for example other Internet services such as a search engine, financial services, third party applications and other Internet based services.

Accordingly, a user may exploit a PED and/or FED within an Enterprise 1760, for example, and access one of the first or second primary content servers 1790A and 1790B respectively to perform an operation such as accessing/downloading an application which provides WCS-WCAP features according to embodiments of the invention; execute an application already installed providing WCS-WCAP features; execute a web based application providing WCS-WCAP features; or access content. Similarly, a USER may undertake such actions or others exploiting embodiments of the invention exploiting a PED or FED within first and second user groups 1700A and 1700B respectively via one of first and second cellular APs 1795A and 1795B respectively and first Wi-Fi nodes 1710A.

Figure 18:
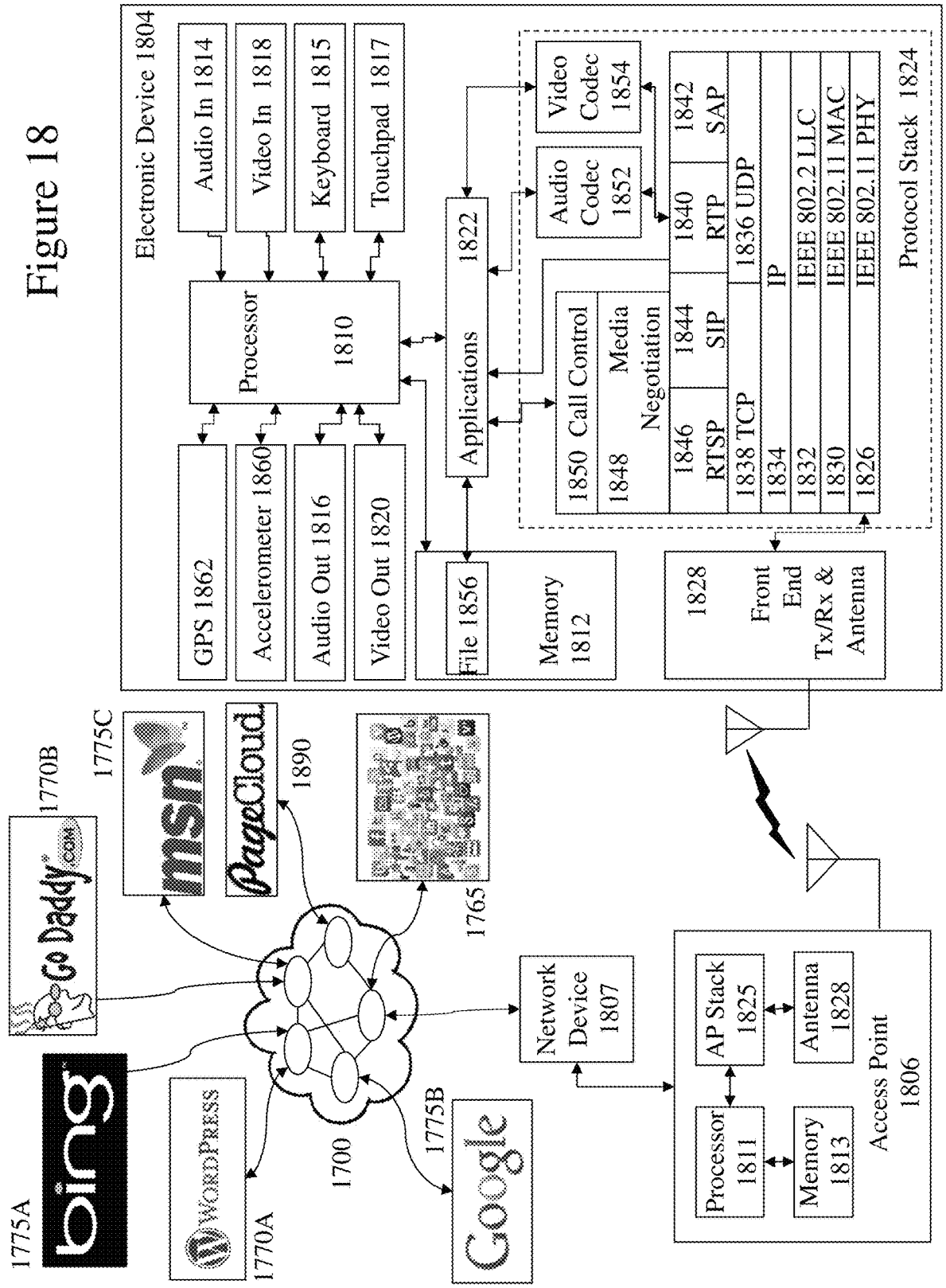
FIG. 18 depicts a wireless portable electronic device supporting communications to a network such as depicted in FIG. 17 and as supporting embodiments of the invention.

Now referring to FIG. 18 there is depicted an electronic device 1804 and network access point 1807 supporting WCS-WCAP features according to embodiments of the invention. Electronic device 1804 may, for example, be a PED and/or FED and may include additional elements above and beyond those described and depicted. Also depicted within the electronic device 1804 is the protocol architecture as part of a simplified functional diagram of a system 1800 that includes an electronic device 1804, such as a smartphone 1755, an access point (AP) 1806, such as first AP 1710, and one or more network devices 1807, such as communication servers, streaming media servers, and routers for example such as first and second servers 1790A and 1790B respectively. Network devices 1807 may be coupled to AP 1806 via any combination of networks, wired, wireless and/or optical communication links such as discussed above in respect of FIG. 17 as well as directly as indicated. Network devices 1807 are coupled to network 1700 and therein Social Networks (SOCNETS) 1765, first and second service providers 1770A and 1770B respectively, e.g. WordPress™ and GoDaddy™, and first to third party providers 1775A to 1775C respectively, e.g. Bing™, Google™, and MSN™, and WCS-WCAP provider 1890, e.g. PageCloud™.

The electronic device 1804 includes one or more processors 1810 and a memory 1812 coupled to processor(s) 1810. AP 1806 also includes one or more processors 1811 and a memory 1813 coupled to processor(s) 1810. A non-exhaustive list of examples for any of processors 1810 and 1811 includes a central processing unit (CPU), a digital signal processor (DSP), a reduced instruction set computer (RISC), a complex instruction set computer (CISC) and the like. Furthermore, any of processors 1810 and 1811 may be part of application specific integrated circuits (ASICs) or may be a part of application specific standard products (ASSPs). A non-exhaustive list of examples for memories 1812 and 1813 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 1804 may include an audio input element 1814, for example a microphone, and an audio output element 1816, for example, a speaker, coupled to any of processors 1810. Electronic device 1804 may include a video input element 1818, for example, a video camera or camera, and a video output element 1820, for example an LCD display, coupled to any of processors 1810. Electronic device 1804 also includes a keyboard 1815 and touchpad 1817 which may for example be a physical keyboard and touchpad allowing the user to enter content or select functions within one of more applications 1822. Alternatively, the keyboard 1815 and touchpad 1817 may be predetermined regions of a touch sensitive element forming part of the display within the electronic device 1804. The one or more applications 1822 that are typically stored in memory 1812 and are executable by any combination of processors 1810. Electronic device 1804 also includes accelerometer 1860 providing three-dimensional motion input to the process 1810 and GPS 1862 which provides geographical location information to processor 1810.

Electronic device 1804 includes a protocol stack 1824 and AP 1806 includes a communication stack 1825. Within system 1800 protocol stack 1824 is shown as IEEE 802.11 protocol stack but alternatively may exploit other protocol stacks such as an Internet Engineering Task Force (IETF) multimedia protocol stack for example. Likewise, AP stack 1825 exploits a protocol stack but is not expanded for clarity. Elements of protocol stack 1824 and AP stack 1825 may be implemented in any combination of software, firmware and/or hardware. Protocol stack 1824 includes an IEEE 802.11-compatible PHY module 1826 that is coupled to one or more Front-End Tx/Rx & Antenna 1828, an IEEE 802.11-compatible MAC module 1830 coupled to an IEEE 802.2-compatible LLC module 1832. Protocol stack 1824 includes a network layer IP module 1834, a transport layer User Datagram Protocol (UDP) module 1836 and a transport layer Transmission Control Protocol (TCP) module 1838.

Protocol stack 1824 also includes a session layer Real Time Transport Protocol (RTP) module 1840, a Session Announcement Protocol (SAP) module 1842, a Session Initiation Protocol (SIP) module 1844 and a Real Time Streaming Protocol (RTSP) module 1846. Protocol stack 1824 includes a presentation layer media negotiation module 1848, a call control module 1850, one or more audio codecs 1852 and one or more video codecs 1854. Applications 1822 may be able to create maintain and/or terminate communication sessions with any of devices 1807 by way of AP 1806. Typically, applications 1822 may activate any of the SAP, SIP, RTSP, media negotiation and call control modules for that purpose. Typically, information may propagate from the SAP, SIP, RTSP, media negotiation and call control modules to PHY module 1826 through TCP module 1838, IP module 1834, LLC module 1832 and MAC module 1830.

It would be apparent to one skilled in the art that elements of the electronic device 1804 may also be implemented within the AP 1806 including but not limited to one or more elements of the protocol stack 1824, including for example an IEEE 802.11-compatible PHY module, an IEEE 802.11-compatible MAC module, and an IEEE 802.2-compatible LLC module 1832. The AP 1806 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 1804 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, and Power line communication (PLC).

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alpha-numeric input unit such as a keyboard, a pointing control device such as a mouse, and so forth.

The memory includes machine-readable code segments (e.g. software or software code) including instructions for performing, when executed by the processing system, one or more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   establishing a web browser in execution upon an electronic device comprising at least a microprocessor and a display for rendering the web browser to a user of the electronic device;
   establishing a web content editor within the web browser; and
   establishing an item of content within the web content editor; wherein
   the web content editor enables the user to perform an activity with respect to the item of content;
   the activity comprises replacing a font associated with the item of content by:
      opening a new browser window within the web browser;
      opening a font library within the new browser window, the font library associated with a plurality of fonts;
      determining a selection of a portion of content displayed to the user within the font library associated with a font of the plurality of fonts;
      copying the selected portion of content;
      pasting the selected portion of content as new content within the item of content;
      determining whether the font associated with the pasted selected portion of content is a new font for the item of content;
      upon a positive determination that the font associated with the pasted selected portion of content is a new font for the item of content the web content editor automatically performs the steps of:
         retrieving the font associated with the pasted selected portion of content from an online font repository;
         installing the font associated with the pasted selected portion of content; and
         rendering to the user a pop-up icon indicating that the wanted font is a new font;
   prior to retrieving the font associated with the pasted selected portion of content from the online font repository the web content editor automatically performs the step of searching a plurality of first online font repositories to determine if the font associated with the pasted selected portion of content is available without cost from a first online font repository of the plurality of first online font repositories;

upon a positive determination that the font associated with the pasted selection is available from a first online font repository establishing the first online font repository as the online font repository;

upon a negative determination that the font associated with the pasted selection is available from a first online font repository the web content editor automatically performs the additional step of searching a plurality of second online font repositories to determine if the font associated with the pasted selected portion of content is available from a second online font repository of the plurality of second online font repositories, wherein each second online font repository of the plurality of second online font repositories requires user registration and is part of a list of repositories the user can access which is stored together with their required user login and access credentials;

upon a positive determination that the font associated with the pasted selection is available from a second online font repository automatically registering with the second online font repository of the plurality of second online font repositories and establishing the second online font repository of the plurality of second online font repositories as the online font repository;

upon a negative determination that the font associated with the pasted selection is available from a second online font repository the web content editor automatically performs the further step of searching a plurality of third online font repositories to determine if the font associated with the pasted selected portion of content is available from a third online font repository of the plurality of third online font repositories, wherein each third online font repository of the plurality of third online font repositories requires the font to be purchased and is part of a list of repositories the user can access which is stored together with their required user login and access credentials; and upon a positive determination that the font associated with the pasted selection is available from a third online font repository automatically registering with the third online font repository of the plurality of third online font repositories and establishing the third online font repository of the plurality of third online font repositories as the online font repository.

2. The method according to claim 1, wherein the activity comprises replacing a font associated with the item of content by automatically detecting a change in a name of the font associated with the item of content within a document object model relating to the item of content.

3. The method according to claim 1, wherein the activity comprises adding a target font to the item of web content comprising the steps of:
copying a portion of content from another item of web content with the target font;
pasting the portion of content to the item of web content; and
automatically establishing the target font and installing the target font as a result of the paste operation.

4. The method according to claim 1, wherein the activity comprises adding a target font to the item of web content comprising the steps of:
dragging and dropping a widget onto the item of web content wherein the widget comprises a uniform resource locator (URL) identifying a source of the target;
automatically accessing the URL and installing the target font as a result of the drag and drop operation.

5. The method according to claim 1, wherein the activity comprises adding a target font to the item of web content comprising the steps of:
receiving a trigger from a user;
generating a pop-up in response to the trigger comprising at least a field for the user to enter a name of the target font;
automatically searching the Internet for an instance of the target font; and
installing the target font.

6. The method according to claim 1, wherein the activity comprises replacing a font associated with the item of content by:
establishing a first selection made by the user of a portion of the item of content;
determining a second selection made by the user to open a document object model (DOM) associated with the selected portion of the item of content;
determining an entry by the user of a wanted font within a field within the DOM associated with a font for rendering the selected portion of the item of content;
determining whether the wanted font is a currently supported font;
upon a positive determination that the wanted font is a currently supported font rendering the selected portion of the item of content with the wanted font; and
upon a negative determination that the wanted font is a currently supported font the web content editor automatically performs the steps of:
searching one or more font repositories accessible to the electronic device over a communications network to which the electronic device and the one or more font repositories are connected;
retrieving the wanted font from a file repository of the one or more font repositories;
installing the wanted font;
loading the wanted font;
rendering to the user a pop-up icon indicating that the wanted font is a new font; and
rendering the selected portion of the item of content with the wanted font.

7. The method according to claim 1, wherein the online font repository is the font library.

8. The method according to claim 1, further comprising determining an action by the user to close the item of content wherein the web content editor automatically makes the modified item of content available online independent of any additional steps of publishing the modified item of content.

9. The method according to claim 1, wherein the activity comprises associating a font with the item of content by:
determining selection of a hot key function by the user;
upon a positive determination automatically rendering within the web browser a font window;
establishing an identity of a font in dependence upon text entered by the user within the font window; and
installing the font.

10. The method according to claim 9, wherein installing the font comprises the web content editor automatically performing the steps of:
searching one or more font repositories accessible to the electronic device over a communications network to which the electronic device and the one or more font repositories are connected;
retrieving the wanted font from a file repository of the one or more font repositories;
installing the wanted font;
loading the wanted font;
rendering to the user a pop-up icon indicating that the wanted font is a new font; and
rendering the selected portion of the item of content with the wanted font.

11. A method comprising:
establishing a web browser in execution upon an electronic device comprising at least a microprocessor and a display for rendering the web browser to a user of the electronic device;
establishing a web content editor within the web browser; and
establishing an item of content within the web content editor; wherein
the web content editor enables the user to perform an activity with respect to the item of content;
the activity comprises replacing a font associated with the item of content by:
  opening a new browser window within the web browser;
  accessing another item of content within the new browser window;
  determining a selection of a portion of the another item of content;
  copying the selected portion of the another item of content;
  pasting the selected portion of the another item of content as new content within the item of content;
  identifying the font associated with the pasted selected portion of the another item of content;
  determining whether the font associated with the pasted selected portion of the another item of content is a new font for the item of content;
  upon a positive determination the web content editor automatically performs the steps of:
    retrieving the font associated with the pasted selected portion of the another item of content from an online font repository;
    installing the font associated with the pasted selected portion of the another item of content; and
    rendering to the user a pop-up icon indicating that the font is a new font; and
installing the new font comprises:
  establishing an online font repository; and
  retrieving the new font from the online font repository; wherein
  prior to retrieving the font associated with the pasted selected portion of content from the online font repository the web content editor automatically performs the step of searching a plurality of first online font repositories to determine if the font associated with the pasted selected portion of content is available without cost from a first online font repository of the plurality of first online font repositories;
  prior to retrieving the font associated with the pasted selected portion of content from the online font repository the web content editor automatically performs the step of searching a plurality of first online font repositories to determine if the font associated with the pasted selected portion of content is available without cost from a first online font repository of the plurality of first online font repositories;
  upon a positive determination that the font associated with the pasted selection is available from a first online font repository establishing the first online font repository as the online font repository;
  upon a negative determination that the font associated with the pasted selection is available from a first online font repository the web content editor automatically performs the additional step of searching a plurality of second online font repositories to determine if the font associated with the pasted selected portion of content is available from a second online font repository of the plurality of second online font repositories, wherein each second online font repository of the plurality of second online font repositories requires user registration and is part of a list of repositories the user can access which is stored together with their required user login and access credentials;
  upon a positive determination that the font associated with the pasted selection is available from a second online font repository automatically registering with the second online font repository of the plurality of second online font repositories and establishing the second online font repository of the plurality of second online font repositories as the online font repository;
  upon a negative determination that the font associated with the pasted selection is available from a second online font repository the web content editor automatically performs the further step of searching a plurality of third online font repositories to determine if the font associated with the pasted selected portion of content is available from a third online font repository of the plurality of third online font repositories, wherein each third online font repository of the plurality of third online font repositories requires the font to be purchased and is part of a list of repositories the user can access which is stored together with their required user login and access credentials; and
  upon a positive determination that the font associated with the pasted selection is available from a third online font repository automatically registering with the third online font repository of the plurality of third online font repositories and establishing the third online font repository of the plurality of third online font repositories as the online font repository.

12. The method according to claim 11, further comprising:
determining an action by the user to close the item of content wherein the web content editor automatically makes the modified item of content available online independent of any additional steps of publishing the modified item of content.

13. The method according to claim 12, wherein the web content editor automatically monitors the user's activities within the new browser window.

14. A method comprising:
establishing a web browser in execution upon an electronic device comprising at least a microprocessor and a display for rendering the web browser to a user of the electronic device;
establishing a web content editor within the web browser; and
establishing an item of content within the web content editor; wherein the web content editor enables the user to perform an activity with respect to the item of content;

the activity comprises associating a font with the item of content by:
opening a widget source within the web browser comprising a plurality of widgets;
establishing a selection by the user of a widget of the plurality of widgets within the widget source;
establishing placement of the widget of the plurality of widgets within the rendered item of content within the web content editor; and
executing the placed widget of the plurality of widgets; wherein
executing the placed widget of the plurality of widgets installs a new font and associates it with the item of content; and installing the new font comprises:
establishing an online font repository; and retrieving the new font from the online font repository; wherein
prior to retrieving the font associated with the executed placed widget of the plurality of widgets from the online font repository the web content editor automatically performs the step of searching a plurality of first online font repositories to determine if a font associated with a pasted selected portion of content is available without cost from a first online font repository of the plurality of first online font repositories;
prior to retrieving the font associated with the pasted selected portion of content from the online font repository the web content editor automatically performs the step of searching a plurality of first online font repositories to determine if the font associated with the pasted selected portion of content is available without cost from a first online font repository of the plurality of first online font repositories;
upon a positive determination that the font associated with the pasted selection is available from a first online font repository establishing the first online font repository as the online font repository;
upon a negative determination that the font associated with the pasted selection is available from a first online font repository the web content editor automatically performs the additional step of searching a plurality of second online font repositories to determine if the font associated with the pasted selected portion of content is available from a second online font repository of the plurality of second online font repositories, wherein each second online font repository of the plurality of second online font repositories requires user registration and is part of a list of repositories the user can access which is stored together with their required user login and access credentials;
upon a positive determination that the font associated with the pasted selection is available from a second online font repository automatically registering with the second online font repository of the plurality of second online font repositories and establishing the second online font repository of the plurality of second online font repositories as the online font repository;
upon a negative determination that the font associated with the pasted selection is available from a second online font repository the web content editor automatically performs the further step of searching a plurality of third online font repositories to determine if the font associated with the pasted selected portion of content is available from a third online font repository of the plurality of third online font repositories, wherein each third online font repository of the plurality of third online font repositories requires the font to be purchased and is part of a list of repositories the user can access which is stored together with their required user login and access credentials; and
upon a positive determination that the font associated with the pasted selection is available from a third online font repository automatically registering with the third online font repository of the plurality of third online font repositories and establishing the third online font repository of the plurality of third online font repositories as the online font repository.

15. The method according to claim 14, wherein
executing the placed widget of the plurality of widgets automatically configures the format of a predetermined portion of the item of content as well as installing the new font.

16. A method comprising:
establishing a web browser in execution upon an electronic device comprising at least a microprocessor and a display for rendering the web browser to a user of the electronic device;
establishing a web content editor within the web browser; and
establishing an item of content within the web content editor; wherein
the web content editor enables the user to perform an activity with respect to the item of content; and
the activity is the installation of a new font comprising:
establishing an identity of the new font to be installed;
establishing an online font repository; and
retrieving the new font from the online font repository; wherein
prior to retrieving the font associated with the executed placed widget of the plurality of widgets from the online font repository the web content editor automatically performs the step of searching a plurality of first online font repositories to determine if a font associated with a pasted selected portion of content is available without cost from a first online font repository of the plurality of first online font repositories; upon a positive determination establishing the first online font repository as the online font repository;
upon a negative determination the web content editor automatically performs the additional step of searching a plurality of second online font repositories to determine if the font associated with the pasted selected portion of content is available from a second online font repository of the plurality of second online font repositories, wherein each second online font repository of the plurality of second online font repositories requires user registration and is part of a list of repositories the user can access which is stored together with their required user login and access credentials;
upon a positive determination automatically registering with the second online font repository of the plurality of second online font repositories and establishing the second online font repository of the plurality of second online font repositories as the online font repository; upon a negative determination the web content editor automatically performs the further step of searching a plurality of third online font repositories to determine if the font associated with the pasted selected portion of content is available from a third online font repository of the plurality of third online font repositories, wherein each third online font repository of the plurality of third online font repositories requires the font to be purchased and is part of a list of repositories the user can access which is stored together with their required user login and access credentials; and upon a positive determination automatically registering with the third online font repository of the plurality of third online font repositories and establishing the third online font repository of the plurality of third online font repositories as the online font repository.

* * * * *